United States Patent
Younkins et al.

(10) Patent No.: US 9,890,732 B2
(45) Date of Patent: Feb. 13, 2018

(54) VALVE FAULT DETECTION

(71) Applicant: Tula Technology, Inc., San Jose, CA (US)

(72) Inventors: Matthew A. Younkins, San Jose, CA (US); Shikui Kevin Chen, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 15/384,924

(22) Filed: Dec. 20, 2016

(65) Prior Publication Data

US 2017/0101956 A1 Apr. 13, 2017

Related U.S. Application Data

(63) Continuation-in-part of application No. 14/700,494, filed on Apr. 30, 2015, now Pat. No. 9,562,470.
(Continued)

(51) Int. Cl.
*F02D 41/00* (2006.01)
*F02D 41/22* (2006.01)
(Continued)

(52) U.S. Cl.
CPC .......... *F02D 41/221* (2013.01); *F02B 77/082* (2013.01); *F02D 13/06* (2013.01);
(Continued)

(58) Field of Classification Search
CPC .......... G01L 3/00; F02D 17/02; F02D 41/221; F02B 77/082
See application file for complete search history.

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| CN | 1204003 | 1/1999 |
| JP | 2003-343411 | 12/2003 |
| JP | 2010-174857 | 8/2010 |

OTHER PUBLICATIONS

Chinese Office Action dated Mar. 27, 2017 from Chinese Application No. 201480012932.6.
(Continued)

*Primary Examiner* — Kevin A Lathers
(74) *Attorney, Agent, or Firm* — Beyer Law Group LLP

(57) ABSTRACT

Methods and systems are described for detecting valve actuation faults in internal combustion engines operating in a skip fire operational mode. In one aspect, for each skip fire working cycle, an expected exhaust pressure is determined for a time period corresponding to a potential exhaust event. One or more exhaust gas pressure sensors are then used to measure an actual exhaust pressure during the potential exhaust period. The actual exhaust pressure is compared to the expected exhaust pressure to determine whether a valve actuation fault has occurred. A variety of valve actuation faults can be identified using the described approach. In some embodiments pressure sensors are deployed in the runners of the exhaust manifold.

15 Claims, 15 Drawing Sheets

Related U.S. Application Data which is a continuation-in-part of application No. 14/487,563, filed on Sep. 16, 2014, now Pat. No. 9,175,613, and a continuation-in-part of application No. 14/207,109, filed on Mar. 12, 2014, now Pat. No. 9,399,963, and a continuation-in-part of application No. 14/582,008, filed on Dec. 23, 2014, now Pat. No. 9,581,097.

(60) Provisional application No. 62/002,762, filed on May 23, 2014, provisional application No. 61/879,481, filed on Sep. 18, 2013, provisional application No. 61/890,671, filed on Oct. 14, 2013, provisional application No. 61/897,686, filed on Oct. 30, 2013, provisional application No. 61/925,157, filed on Jan. 8, 2014, provisional application No. 61/799,180, filed on Mar. 15, 2013.

(51) Int. Cl.
| | |
|---|---|
| *F02D 17/02* | (2006.01) |
| *F02B 77/08* | (2006.01) |
| *G01M 15/04* | (2006.01) |
| *G01P 15/00* | (2006.01) |
| *G01L 3/00* | (2006.01) |
| *F02D 41/14* | (2006.01) |
| *F02D 41/30* | (2006.01) |
| *F02D 13/06* | (2006.01) |
| *F02D 35/02* | (2006.01) |

(52) U.S. Cl.
CPC ........... *F02D 17/02* (2013.01); *F02D 35/023* (2013.01); *F02D 35/024* (2013.01); *F02D 41/0087* (2013.01); *F02D 41/1401* (2013.01); *F02D 41/1448* (2013.01); *F02D 41/1498* (2013.01); *F02D 41/22* (2013.01); *F02D 41/3058* (2013.01); *G01L 3/00* (2013.01); *G01M 15/042* (2013.01); *G01P 15/00* (2013.01); *F02D 2041/001* (2013.01); *F02D 2041/1412* (2013.01); *F02D 2041/1433* (2013.01); *F02D 2041/227* (2013.01); *Y02T 10/18* (2013.01)

(56) References Cited

U.S. PATENT DOCUMENTS

| | | | |
|---|---|---|---|
| 4,509,488 A | 4/1985 | Forster et al. | |
| 5,278,760 A | 1/1994 | Ribbens et al. | |
| 5,355,713 A * | 10/1994 | Scourtes | G01M 15/106 73/114.76 |
| 5,377,631 A | 1/1995 | Schechter | |
| 5,377,720 A | 1/1995 | Stobbs et al. | |
| 5,490,486 A | 2/1996 | Diggs | |
| 5,537,963 A | 7/1996 | Hasebe et al. | |
| 5,581,022 A | 12/1996 | Sprague et al. | |
| 5,584,281 A | 12/1996 | Katoh | |
| 5,734,100 A | 3/1998 | Kishimoto et al. | |
| 5,753,804 A | 5/1998 | La Palm et al. | |
| 5,775,298 A | 7/1998 | Haller | |
| 5,796,261 A | 8/1998 | Golab | |
| 5,803,040 A | 9/1998 | Biesinger et al. | |
| 6,006,157 A | 12/1999 | Dai et al. | |
| 6,023,651 A | 2/2000 | Nakayama et al. | |
| 6,158,411 A | 12/2000 | Morikawa | |
| 6,431,154 B1 | 8/2002 | Inoue | |
| 6,439,176 B1 | 8/2002 | Payne et al. | |
| 6,494,087 B2 | 12/2002 | Hatano et al. | |
| 6,584,951 B1 | 7/2003 | Patel et al. | |
| 6,591,666 B1 | 7/2003 | Kacewicz et al. | |
| 6,615,776 B1 | 9/2003 | Von Andrian-Werburg | |
| 6,619,258 B2 | 9/2003 | McKay et al. | |
| 6,655,353 B1 | 12/2003 | Rayl | |
| 6,691,021 B2 * | 2/2004 | Takagi | F01L 1/46 123/690 |
| 6,752,004 B2 | 6/2004 | Inada et al. | |
| 6,752,121 B2 | 6/2004 | Rayl et al. | |
| 6,782,865 B2 | 8/2004 | Rayl et al. | |
| 7,025,035 B1 | 4/2006 | Duty et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,314,034 B1 * | 1/2008 | Waters | F02D 13/06 123/198 F |
| 7,357,019 B2 | 4/2008 | McDonald | |
| 7,395,813 B2 | 7/2008 | Pagot | |
| 7,458,346 B2 | 12/2008 | Gibson | |
| 7,484,484 B2 | 2/2009 | Frinke et al. | |
| 7,490,001 B2 | 2/2009 | Izelfanane | |
| 7,503,296 B2 | 3/2009 | Rozario et al. | |
| 7,503,312 B2 | 3/2009 | Surnilla et al. | |
| 7,546,827 B1 | 6/2009 | Wade et al. | |
| 7,577,511 B1 | 8/2009 | Tripathi et al. | |
| 7,595,971 B2 | 9/2009 | Ganev et al. | |
| 7,757,657 B2 | 7/2010 | Albertson et al. | |
| 7,762,237 B2 | 7/2010 | Gibson et al. | |
| 7,819,096 B2 | 10/2010 | McConville et al. | |
| 7,854,215 B2 | 12/2010 | Rozario et al. | |
| 7,900,509 B2 | 3/2011 | Feldkamp et al. | |
| 7,908,913 B2 | 3/2011 | Cinpinski et al. | |
| 7,918,210 B2 | 4/2011 | Gibson et al. | |
| 7,921,709 B2 | 4/2011 | Doering et al. | |
| 7,930,087 B2 | 4/2011 | Gibson et al. | |
| 7,942,039 B2 | 5/2011 | Huber et al. | |
| 7,946,262 B2 | 5/2011 | Borraccia et al. | |
| 8,006,670 B2 | 8/2011 | Rollinger et al. | |
| 8,091,412 B2 | 1/2012 | Forte et al. | |
| 8,099,224 B2 | 1/2012 | Tripathi et al. | |
| 8,103,433 B2 | 1/2012 | Hartmann et al. | |
| 8,181,508 B2 | 3/2012 | Cinpinski et al. | |
| 8,286,471 B2 | 10/2012 | Doering et al. | |
| 8,301,362 B2 | 10/2012 | Buslepp et al. | |
| 8,511,281 B2 | 8/2013 | Tripathi et al. | |
| 8,550,055 B2 | 10/2013 | Ferch et al. | |
| 8,601,862 B1 | 12/2013 | Bowman et al. | |
| 8,631,688 B1 | 1/2014 | Rayl et al. | |
| 8,666,641 B2 | 3/2014 | Rollinger et al. | |
| 8,667,835 B2 | 3/2014 | Doering et al. | |
| 8,826,891 B2 | 9/2014 | Nishikiori et al. | |
| 9,086,020 B2 | 7/2015 | Tripathi et al. | |
| 9,175,613 B2 | 11/2015 | Parsels et al. | |
| 9,399,963 B2 | 7/2016 | Loucks et al. | |
| 9,399,964 B2 | 7/2016 | Younkins et al. | |
| 9,482,202 B2 | 11/2016 | Carlson et al. | |
| 2001/0047792 A1 | 12/2001 | Akazaki et al. | |
| 2002/0121252 A1 | 9/2002 | Payne et al. | |
| 2005/0033501 A1 | 2/2005 | Liu et al. | |
| 2005/0150561 A1 | 7/2005 | Flynn et al. | |
| 2005/0199220 A1 | 9/2005 | Ogiso | |
| 2006/0129307 A1 | 6/2006 | Yasui | |
| 2008/0060427 A1 | 3/2008 | Hoshi et al. | |
| 2008/0092836 A1 | 4/2008 | Mutti et al. | |
| 2009/0254242 A1 | 10/2009 | Kweon et al. | |
| 2010/0031738 A1 | 2/2010 | Feldkamp et al. | |
| 2010/0050993 A1 | 3/2010 | Zhao et al. | |
| 2010/0154738 A1 | 6/2010 | Tsukamoto et al. | |
| 2010/0175462 A1 | 7/2010 | Doering et al. | |
| 2010/0286891 A1 | 11/2010 | Huang et al. | |
| 2010/0288035 A1 | 11/2010 | Arakawa | |
| 2011/0072893 A1 | 3/2011 | Malacznski | |
| 2011/0167900 A1 | 7/2011 | Zanotti et al. | |
| 2012/0109495 A1 | 5/2012 | Tripathi et al. | |
| 2012/0143471 A1 | 6/2012 | Tripathi et al. | |
| 2012/0173122 A1 | 7/2012 | Nishikiori et al. | |
| 2012/0285161 A1 | 11/2012 | Kerns et al. | |
| 2012/0310505 A1 | 12/2012 | Morgan et al. | |
| 2013/0325290 A1 | 12/2013 | Pierik | |
| 2014/0000555 A1 | 1/2014 | Glugla et al. | |
| 2014/0041624 A1 | 2/2014 | Rayl et al. | |
| 2014/0261317 A1 | 9/2014 | Loucks et al. | |
| 2015/0192080 A1 | 7/2015 | Younkins et al. | |

(56) References Cited

U.S. PATENT DOCUMENTS

| | | |
|---|---|---|
| 2015/0233289 A1 | 8/2015 | Younkins et al. |
| 2015/0377095 A1 | 12/2015 | Walther et al. |
| 2016/0024981 A1 | 1/2016 | Parsels et al. |
| 2016/0109330 A1 | 4/2016 | Chen et al. |
| 2017/0299466 A1 | 10/2017 | Chen et al. |

OTHER PUBLICATIONS

Shost et al., U.S. Appl. No. 15/171,931, filed Jun. 2, 2016.
Chen et al., U.S. Appl. No. 15/701,155, filed Sep. 11, 2017.
International Search Report dated Aug. 12, 2015 from International Application No. PCT/US2015/029098.
Written Opinion dated Aug. 12, 2015 from International Application No. PCT/US2015/029098.
International Preliminary Report on Patentability dated May 10, 2016 from International Application No. PCT/US2015/029098.
International Search Report dated Jul. 8, 2014 from International Application No. PCT/US2014/026142.
Written Opinion dated Jul. 8, 2014 from International Application No. PCT/US2014/026142.
International Search Report dated Jan. 27, 2016 from International Application No. PCT/US2015/055145.
Written Opinion dated Jan. 27, 2016 from International Application No. PCT/US2015/055145.
International Search Report dated Dec. 22, 2014 from International Application No. PCT/US2014/055902.
Written Opinion dated Dec. 22, 2014 from International Application No. PCT/US2014/055902.

\* cited by examiner

VALVE FAULT DETECTION

CROSS REFERENCE TO RELATED APPLICATIONS

This application is a Continuation-in-Part of U.S. patent application Ser. No. 14/700,494, filed on Apr. 30, 2015. U.S. patent application Ser. No. 14/700,494 claims priority of U.S. Provisional Application No. 62/002,762 filed May 23, 2014. U.S. patent application Ser. No. 14/700,494 is also a Continuation-in-Part of U.S. patent application Ser. No. 14/487,563, (now U.S. Pat. No. 9,175,613) filed Sep. 16, 2014; Ser. No. 14/207,109 (now U.S. Pat. No. 9,399,963) filed Mar. 12, 2014; and Ser. No. 14/582,008 filed Dec. 23, 2014. U.S. patent application Ser. No. 14/487,563 in turn claims priority of U.S. Provisional Patent Application Nos. 61/879,481 filed Sep. 18, 2013, 61/890,671 filed Oct. 14, 2013, 61/897,686 filed Oct. 30, 2013, 61/925,157 filed Jan. 8, 2014 and 62/002,762 filed May 23, 2014. U.S. patent application Ser. No. 14/207,109 claims priority of U.S. Provisional Patent Application Nos. 61/799,180 filed Mar. 15, 2013, and 61/897,686 filed Oct. 30, 2013. U.S. patent application Ser. No. 14/582,008 claims priority of U.S. Provisional Patent Application Nos. 61/925,157 filed Jan. 8, 2014 and 62/002,762 filed May 23, 2014. Priority is claimed to each of the foregoing applications and each of the priority applications are incorporated herein by reference.

FIELD OF THE INVENTION

The present invention relates generally to methods and arrangements for monitoring valve operation in an engine. The invention is particularly useful in identifying valve actuation faults during skip fire operation of an internal combustion engine.

BACKGROUND

Fuel efficiency of many types of internal combustion engines can be substantially improved by varying the displacement of the engine. This allows for the full torque to be available when required, yet can significantly reduce pumping losses and improve thermodynamic efficiency by using a smaller displacement when full torque is not required. The only commercially available method of varying the displacement today is deactivating a group of cylinders substantially simultaneously. In this approach no fuel is delivered to the deactivated cylinders and their associated intake and exhaust valves are kept closed as long as the cylinders remain deactivated. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed mode displacements.

Another engine control approach that varies the effective displacement of an engine is referred to as "skip fire" engine control. In general, skip fire engine control contemplates selectively skipping the firing of certain cylinders during selected firing opportunities. Thus, while operating at a particular effective displacement, a particular cylinder may be fired during one engine cycle and then may be skipped during the next engine cycle and then selectively skipped or fired during the next. In this manner, even finer control of the effective engine displacement is possible. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice many implementations restrict operation to a set of available firing fractions, sequences or patterns. The applicant has filed a number of patents describing various approaches to skip fire control.

When operating in skip fire mode, it is generally desirable to deactivate cylinders during skipped working cycles in the sense that air is not passed through the cylinder during the skipped working cycle as it would be if the intake and exhaust valves were opened in the normal manner. Deactivating cylinders during skipped working cycles tends to improve fuel efficiency (due to reduced pumping losses) and improve emissions—since many emission control systems (e.g., catalytic converters) are not designed to handle large amount of air. Therefore, when implementing skip fire control it is desirable to control the intake and exhaust valves in a more complex manner than if the cylinders are always activated or deactivated in sets for prolonged periods of time as occurs with conventional variable displacement engines.

If a valve doesn't activate or deactivate when intended, the performance of the engine can be adversely affected. Engine performance can also be adversely affected if the valve does not open in the manner expected (e.g., if the dwell time of a valve opening is different than expected or the valve lift height is different than expected). Therefore, regardless of the valve actuation strategy employed, it is desirable to be able to verify that the valves have operated as desired and to identify valve actuation faults for both control and diagnostics purposes.

The Applicant has developed a number of approaches for identifying whether an exhaust valve and/or an intake valve has opened or remains closed in particular circumstances. The described techniques can be used independently, or in any desired combination to monitor valve operation and/or to identify valve actuation faults. The resulting knowledge can be used to help manage, diagnose and/or control skip fire operation of an engine and/or to take remedial action when valve actuation faults are detected.

SUMMARY

A variety of methods and systems are described for detecting valve actuation faults and/or the occurrence of high pressure exhaust springs in internal combustion engines operating in a skip fire operational mode. In one aspect, for each skip fire working cycle, an expected exhaust pressure is determined for a time period corresponding to a potential exhaust event. One or more exhaust gas pressure sensors are then used to measure an actual exhaust pressure during the potential exhaust period. The actual exhaust pressure is compared to the expected exhaust pressure to determine whether a valve actuation fault has occurred.

A variety of valve actuation faults can be identified using the described approach. These include determining whether an exhaust valve failed to activate/reactivate when intended (i.e., if the an exhaust valve failed to open during a fired working cycle in which it was intended to open) and determining whether an exhaust valve opened during a working cycle in which it was intended to be held closed. The nature of the detected pressure/pressure profile can be used to help diagnose a number of faults including any of (i) determining whether an unexpected air pulse was pumped through a working chamber; (ii) determining whether combusted exhaust gases were expelled from a working chamber when they were intended to be held within the working chamber to form a high pressure gas spring; and (iii) determining whether an unexpected reexhaust event has occurred in a working chamber.

In some embodiments, the described approach can be used to help determine whether an exhaust valve timing fault has occurred; or (ii) an exhaust valve lift fault has occurred. The described approach can also contribute to the determination of whether an intake valve actuation fault has occurred if the exhaust valve is opened.

In some embodiments pressure sensors are deployed in the runners of the exhaust manifold. In some implementations, each runner has its own pressure sensor.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
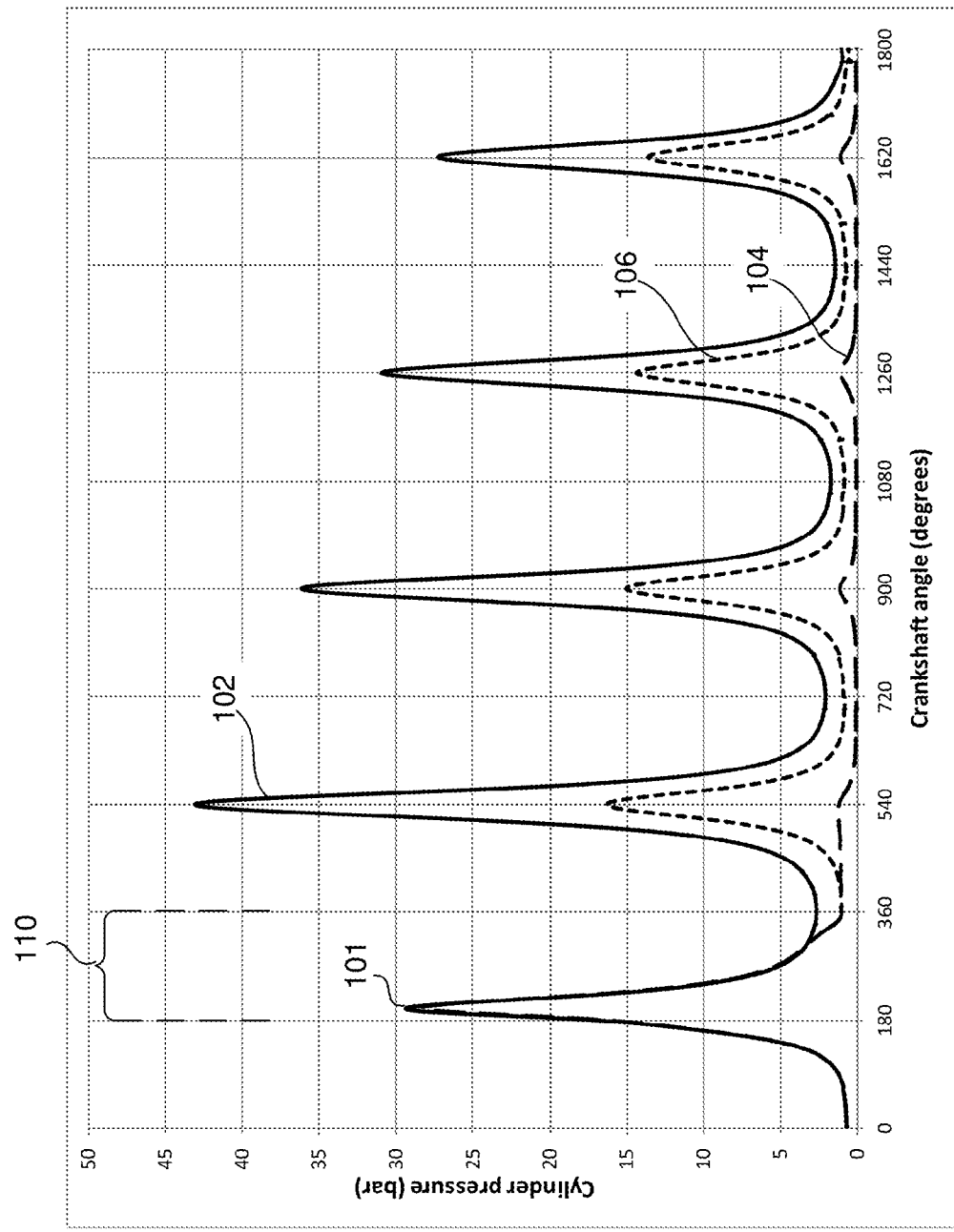
FIG. 1 is a graph that shows the expected pressure in a representative cylinder under a variety of different valve actuation scenarios.

There are a number of valve actuation strategies that may be used during skip fire control to effectively deactivate a cylinder during a skipped working cycle or for other purposes. For example, the intake valve(s) may be kept closed during the "intake" stroke of each skipped working cycle and the exhaust valve(s) may be kept closed during the corresponding "exhaust" stroke. When this occurs, the exhaust gases from the previous fired working cycle will have been substantially expelled, although a small amount of residual exhaust gases would typically remain trapped within the cylinder. In a 4-stroke engine, the residual exhaust gas are expanded and compressed twice during each skipped working cycle. The pressure within the cylinder tends to be relatively close to atmospheric pressure at the time the exhaust valve is closed—so expansion during the inactive "intake" stroke results in a sub-atmospheric pressure within the cylinder and therefore a certain amount of energy is required during the inactive "intake" stoke to expand the residual exhaust gases. That energy is recaptured in large part during the following stroke since the sub-atmospheric pressure within the cylinder effectively helps pull the piston toward the position at which the exhaust valve was closed. The same process is repeated during each reciprocation of the engine as long as all of the valves remain closed. As such, the residual gases trapped within the cylinder operate something like a gas spring during each reciprocation of the engine until the next valve actuation event occurs. Since the pressure of the residual gases within the cylinder is relatively low, such an approach is sometimes referred to herein as a low pressure gas or exhaust spring (LPES) valve actuation scheme.

Another cylinder deactivation approach contemplates keeping the exhaust valve(s) closed after a combustion event and the immediately following intake valve is also kept closed so that all of the hot exhaust gases are trapped within the cylinder. When this occurs, a substantial amount of energy is required to compress the hot combustion gasses trapped within the cylinder during the non-activated exhaust stroke (and the following compression stroke) and much of that energy is returned during the interleaved inactive "intake" and "combustion" strokes which results in the cylinder acting something like a high pressure gas spring until the next valve actuation event occurs. Such an approach is sometimes referred to herein as a high pressure gas or exhaust spring (HPES) valve actuation scheme. In practice, some of the trapped gases tend to escape past the piston rings when a high pressure gas spring is used so that the pressure within the cylinder will decay over time. The temperature of the trapped gases also gradually decreases further contributing to a gradual decay of the pressure within the cylinder.

Still another skipped working cycle valve actuation strategy contemplates drawing air into the cylinder in a normal manner during the intake stroke of a skipped working cycle, but not combusting or expelling the air during the associated "combustion" and "exhaust" strokes of the skipped working cycle. That is, the intake valve is opened, but the exhaust valve is not opened during the skipped working cycle. In such a circumstance, an air charge is present within the cylinder during reciprocations with the valves closed. Such an approach is sometimes referred to herein as an air spring (AS) valve actuation scheme.

There are a number of other valve actuation scenarios that may be used or encountered during skip fire control as well. For example, it may be desirable in some circumstances to deactivate the intake valve during skipped working cycles, but to open the exhaust valve at the end of each working cycle. This approach is sometimes referred to as a re-exhaust approach. Conversely, in some circumstance it may be desirable to open the intake valve, but keep the exhaust valve closed during each skipped working cycle.

FIG. 1 shows the cylinder pressure versus time through multiple working cycles of a four-stroke internal combustion for the HPES, LPES, and AS cases. A 4-cycle engine takes two crankshaft revolutions, 720 degrees, to complete a working cycle. On each working cycle the piston passes twice through the top dead center (TDC) position and twice through the bottom dead center (BDC) position. In FIG. 1 the horizontal axis is crankshaft angle and the vertical axis is cylinder pressure. A combustion event 101 occurs at a crankshaft angle of approximately 180 degrees. Associated with the combustion event is a sharp increase in cylinder pressure. In one case, after the combustion event both the intake and exhaust valves remain closed forming a HPES. Curve 102 plots the cylinder pressure resulting with a HPES in the cylinder. In another case, the exhaust valve opens after the combustion event forming a LPES. Curve 104 plots the cylinder pressure resulting with a LPES in the cylinder. As can be seen from inspection of FIG. 1 the cylinder pressure in the HPES case can exceed 40 bar at a crankshaft angle of approximately 540°. This compares to the LPES case where the cylinder pressure is always less than 2 bar after completion of the power stroke 110 following the combustion event 101. Subsequent TDC positions after 540 degrees have lower maximum pressure values for the HPES case 102, since the gases in the cylinder are cooling and there is some leakage of gas from the cylinder. The LPES case 104 is essentially identical between these successive TDC positions. The final case plotted is that of an air spring (AS), curve 106. This case corresponds to both the intake and exhaust valves opening after the combustion event 101. However, after the intake event the engine does not fire and both the exhaust and intake valves remain closed during subsequent engine cycles. The pressures here are intermediate between the HPES and LPES cases. Like the HPES case, the peak pressure at TDC gradually decreases on subsequent engine cycles because of leakage past the piston rings. The relative decline is slower than in the HPES case because the initial charge never is heated by combustion and there is less leakage around the piston rings due to the lower pressures.

As previously stated, if a valve doesn't activate or deactivate when intended, the performance of the engine can be adversely affected. Engine performance can also be adversely affected if the valve does not open in the manner expected (e.g., if the dwell time of a valve opening is different than expected or the valve lift height is different than expected). Therefore, regardless of the valve actuation strategy employed, it is desirable to be able to verify that the valves have operated as desired and to identify valve actuation faults for both control and diagnostics purposes.

The Applicant has developed a number of approaches for identifying whether an exhaust valve and/or an intake valve has opened or remains closed in particular circumstances. The described techniques can be used independently, or in any desired combination to monitor valve operation and/or to identify valve actuation faults. The resulting knowledge can be used to help manage, diagnose and/or control skip fire operation of an engine and/or to take remedial action when valve actuation faults are detected.

One particularly important fault to identify is the failure to vent a cylinder when desired after a cylinder firing. Most intake valve systems are not designed to open against high pressure gases within a cylinder. Therefore, if the exhaust gases associated with a cylinder firing are not vented, attempting to open the intake valve could potentially damage the valve, push rod, rocker, lifter or other component in the valve train because of the high pressure contained in the cylinder when the intake valve is opened. Accordingly, it is desirable to verify that a cylinder has been vented prior to activation of the intake valve. A safety circuit can then be employed to disable the following intake valve actuation when a high pressure exhaust spring occurs.

Torque Model

One described valve actuation detection approach uses a torque model to determine the expected net engine torque and then compares the expected net engine torque to the actual measured torque. The torque for any given cylinder is proportional to the product of cylinder pressure and the effective lever arm between the cylinder and crankshaft. The lever arm varies throughout a working cycle. At top dead center (TDC) and bottom dead center (BTC) the lever arm is zero and thus the torque generated at these points is zero. Various valve actuation faults can be identified by analyzing differences between the expected and measured torques. Since the firing sequence and engine operating conditions at any time are known or can be reasonably estimated, the net crankshaft torque expected at any time can be calculated. That is, the torque that each cylinder of interest is expected to contribute to or draw from the crankshaft during any period can be calculated. Other torques, such as a load from an air conditioner or other accessory, can similarly be estimated. The sum of these cylinder torque contributions and any other contributions is the net expected crankshaft torque. The magnitude of the difference between a measured torque and the expected torque can be highly suggestive of certain types of faults. Although the term torque is used in this description, it should be appreciated that the model and the measurements may consider and/or be based on any parameter that is reasonably indicative of torque, including the rotational speed of the crankshaft, or any time derivatives thereof, such as rotational acceleration or jerk.

U.S. Pat. No. 9,399,963, filed Mar. 12, 2014 (TULAP033) and Provisional Application No. 61/897,686 filed Oct. 30, 2013 (TULAP033P), each of which is incorporated herein by reference, describe the use of a torque model to detect misfire events. Very generally, the expected torque (or a parameter indicative of torque such as crankshaft acceleration or engine speed) at any stage is calculated and differences between the expected torque and the actual measured torque can be analyzed to identify misfires. The torque model can sum the torque contribution/draw imparted by each cylinder, or a subset of the cylinders that have the largest expected impact on the overall engine torque. The same type of models may be used to determine whether certain valves have opened and/or closed as expected. For example, when an exhaust valve opens in a normal manner, the pressure within the cylinder during the later portion of the exhaust stroke through top dead center (TDC) will typically be fairly close to atmospheric pressure (e.g. 1 bar). In contrast, when an engine is operated substantially unthrottled, the pressure within a fired cylinder at TDC during the first occurrence of a high pressure spring may be greater than 40 bar as shown in FIG. 1. Therefore, it takes a tremendous amount of energy to compress combustion gases during an exhaust stroke if the exhaust valve is not opened. In contrast, the exhaust stroke takes relatively little energy when the exhaust valve is opened. Of course, the actual pressure within the cylinder vary will widely based on engine characteristics (e.g., compression ratio) and operating parameters (e.g. mass air charge (MAC), spark timing, etc.), engine temperature, gas leakage past the piston rings, etc. However, these types of differences can readily be detected by monitoring crankshaft acceleration. The potential magnitude of the differences can be graphically seen by comparing the torque contribution of a representative cylinder under several different scenarios as illustrated in FIG. 2.

Figure 2:
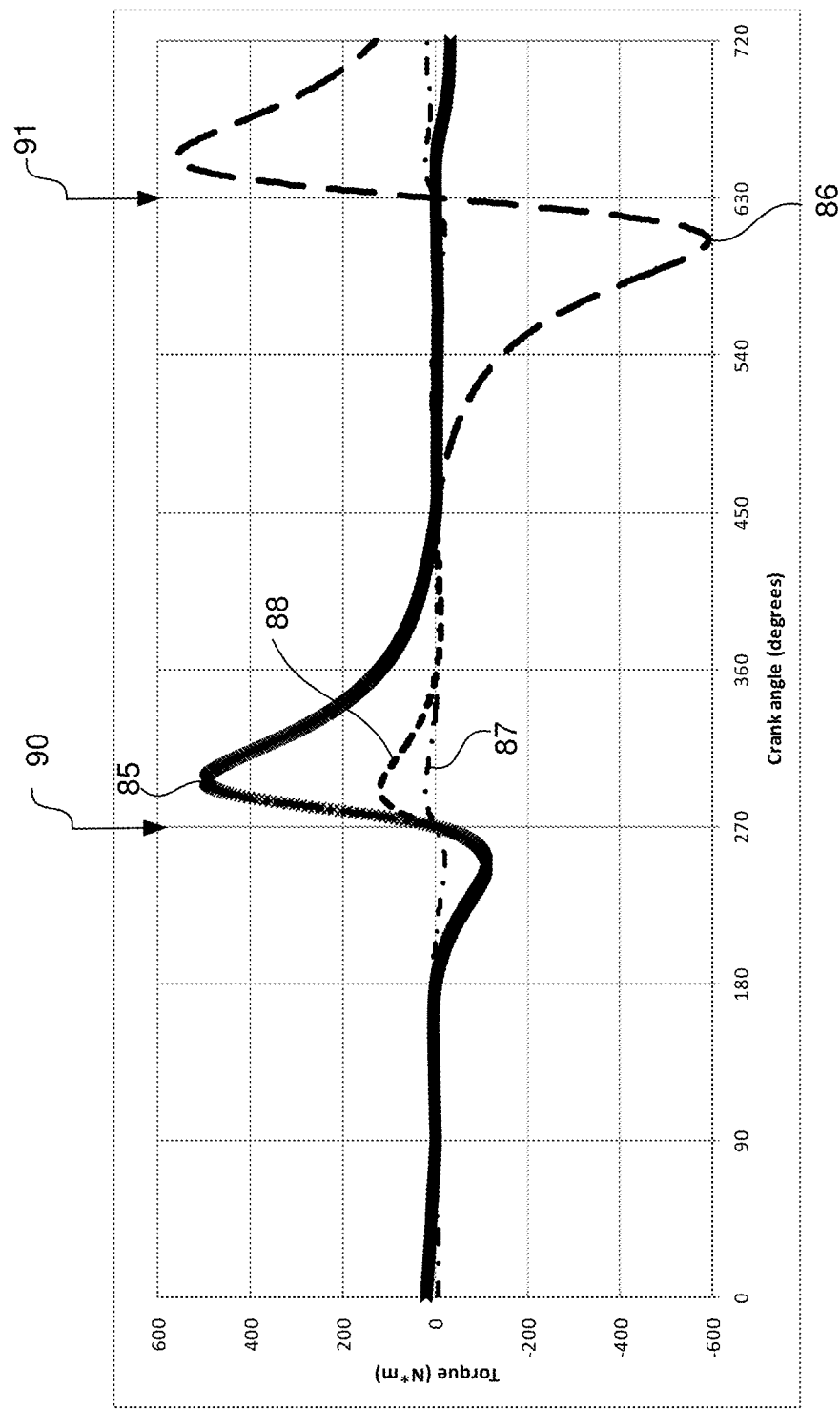
FIG. 2 is a graph that shows the expected torque output of a representative cylinder under a variety of different valve actuation and engine operating scenarios.

FIG. 2 graphs the expected torque output of a representative cylinder under 4 different scenarios. Line 85 shows the torque contribution of the cylinder during a "normal" cylinder firing in which the intake and exhaust valves are opened in a normal manner. In contrast, line 86 shows the torque contribution of a cylinder in the event that the cylinder has a normal intake and firing in the vicinity of the first TDC 90, but the exhaust valve and intake valve are subsequently held closed thereby resulting in a high pressure exhaust spring. Line 87 shows the torque contribution of the cylinder during a skipped working cycle with a low pressure exhaust spring valve actuation scheme. Line 88 shows the potential torque contribution of the cylinder during a misfire event with the valves opened in a normal manner. It can be seen that the impact of the high pressure exhaust spring is quite pronounced. Particularly in the vicinity of the second TDC 91 (the first TDC after the exhaust valve is closed) the torque signature of the HPES case 86 differs significantly from that of the other cases.

Figure 3A:
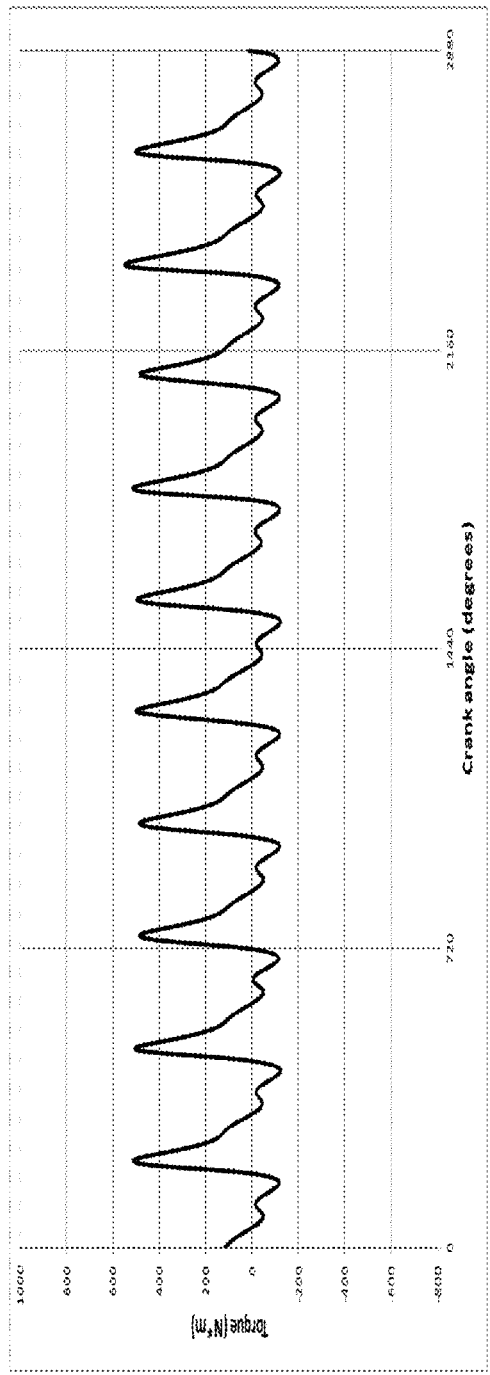
FIG. 3(a) illustrates the crankshaft acceleration experienced by a representative 8-cylinder engine operating at a $\frac{1}{3}^{rd}$ firing fraction.
Figure 3B:
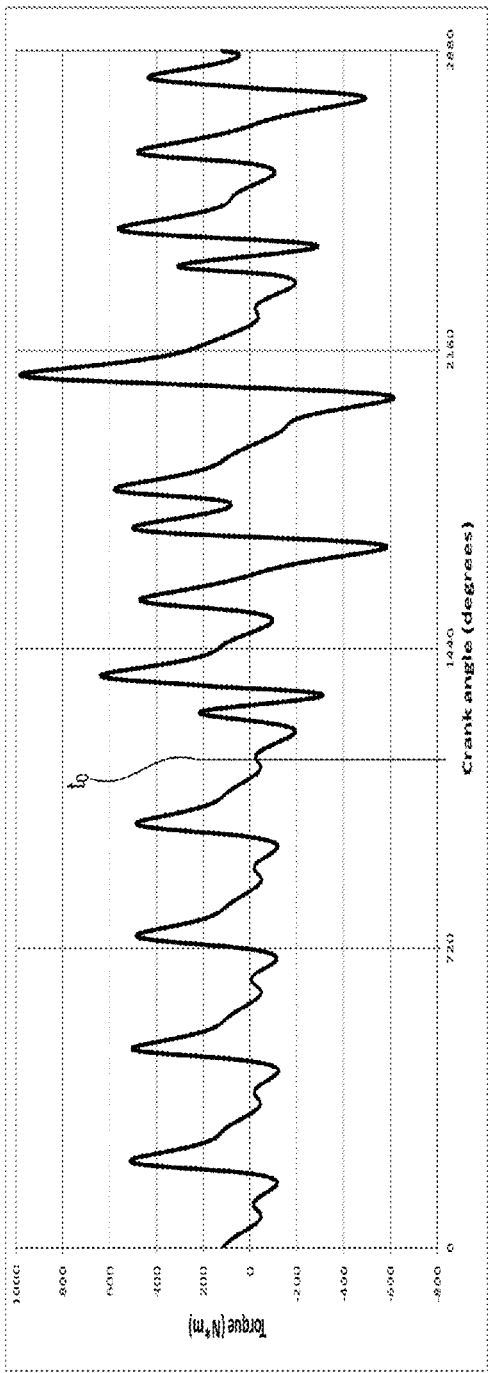
FIG. 3(b) illustrates the crankshaft acceleration experienced by the engine of FIG. 3(a) when a high pressure exhaust spring replaces a normal exhaust at time $t_0$.

The impact of a high pressure exhaust spring on overall engine torque can also be very pronounced as can be seen by comparing the graphs of FIGS. 3(*a*) to 3(*b*). FIG. 3(*a*) illustrates the crankshaft acceleration experienced by an 8-cylinder, 4-stroke engine operating at a firing fraction of $\frac{1}{3}^{rd}$ in the low pressure exhaust spring mode (i.e. each fired working cycle is followed by two skipped working cycles and the exhaust valve opens after a combustion event). In contrast, FIG. 3(*b*) illustrates the crankshaft acceleration experienced by the same engine when a high pressure exhaust spring replaces a normal exhaust at time $t_0$. Again, it can be seen that the effect is quite dramatic.

Since the torque impact of a high pressure spring (intended or otherwise) is quite noticeable, it can readily be detected by monitoring crankshaft acceleration or any other parameter indicative of net engine torque. One approach monitors crankshaft acceleration over a window corresponding to a portion of an exhaust stroke following a combustion event. The size and location of the window analyzed can vary based on the needs of the control, monitoring and/or diagnostic systems that utilize the information. Generally, the differential effects of a high pressure spring vs. an opened exhaust valve will begin when the exhaust valve would be opened in a conventional manner following a combustion event and will be the greatest at a point before the piston reaches top dead center of that first exhaust stroke. The impact will then continue for a number of engine cycles until the exhaust spring is released by opening one of the intake or exhaust valves (generally opening the exhaust valve is preferred), or until the pressure within the cylinder decays due to cooling and leakage effects. Given the varying impact of the exhaust spring, the selection of the window(s) for analysis may involve tradeoffs between the need for early information (as may be required to deactivate a following intake valve opening in the event of an exhaust valve actuation fault), ease and robustness of detection and the availability of more complete information.

When used as the basis for a safety circuit, it is important that the analyzed window be soon enough that the intake valve can be deactivated or prevented from being activated, as appropriate, to insure that the intake valve is not opened in the immediately following working cycle. Since the maximum torque differential typically occurs in the neighborhood of 30 to 50 degrees prior to top dead center, there is sufficient time to prevent the opening of the intake valve after the detection of an unexpected high pressure spring. There is some difference in the torque signature even earlier in the engine cycle, so in some cases it may be desirable to make torque comparisons earlier, to allow extra time for intake valve deactivation. Additionally or alternatively, upon detection of an exhaust valve actuation fault that results in an unintended high pressure exhaust spring, the valve controller can be arranged to direct or redirect the opening of the relevant exhaust valve. This type of control is particularly applicable for electromagnetically controlled valves.

Figure 4:
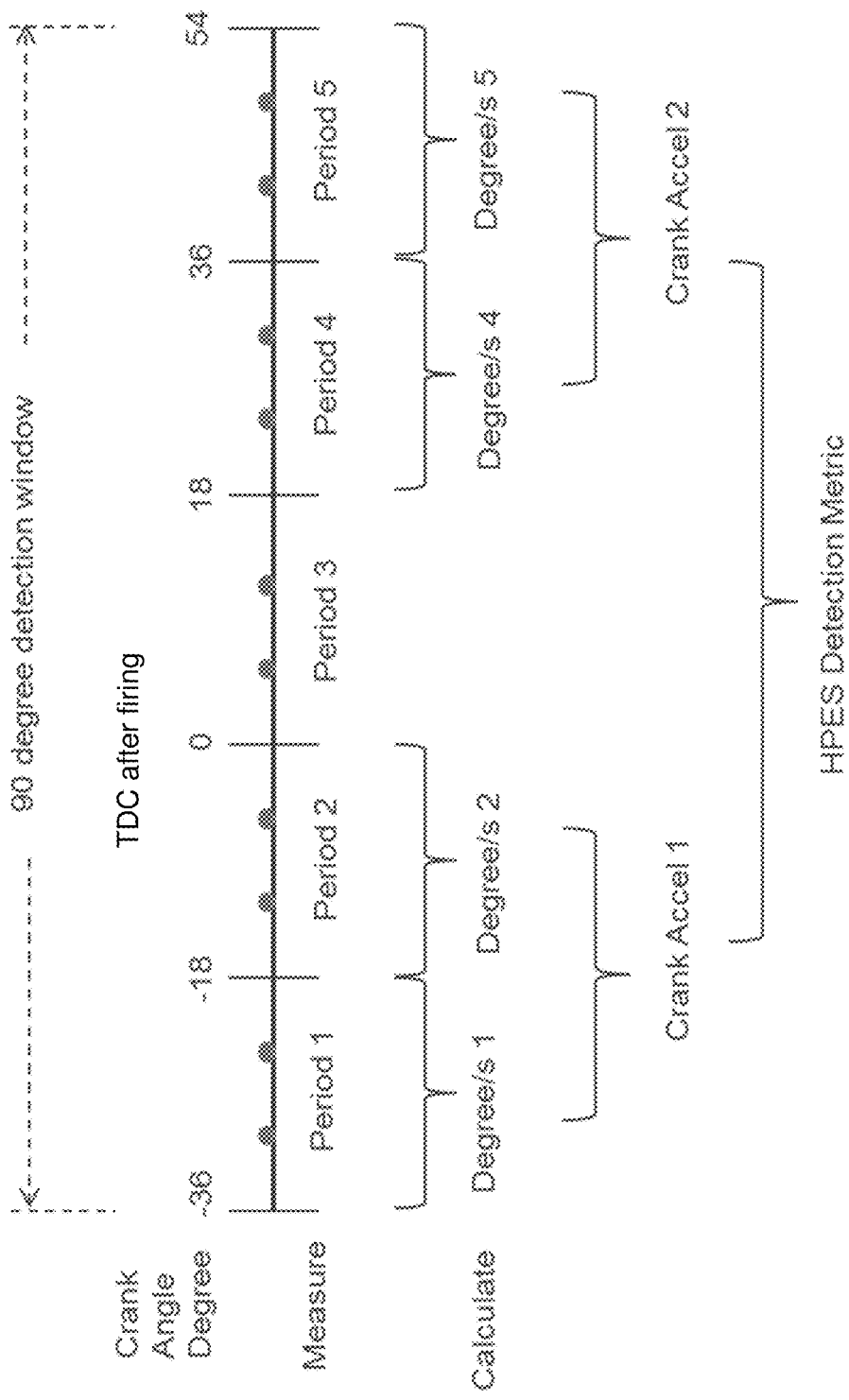
FIG. 4 is part of an algorithm for detecting a high pressure exhaust spring according to one embodiment of the present invention.
Figure 5:
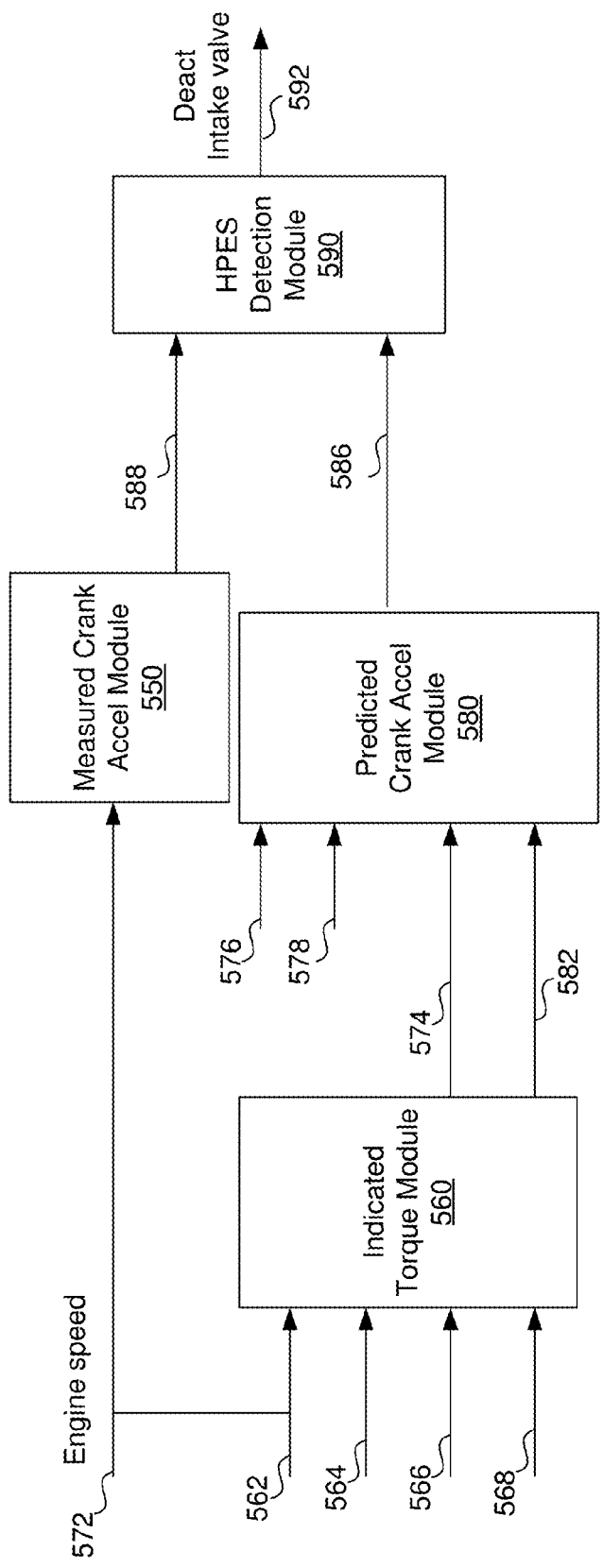
FIG. 5 shows a flow diagram for high pressure exhaust spring detection according to an embodiment.

The angular crank acceleration may be calculated in a Measured Crank Accel Calculation module 550 (FIG. 5). The calculation may be performed over a 90-degree moving window and updated every 6 degrees (every crank tooth), as depicted in FIG. 4. The 90-degree window may be further divided into two segments, each of 42 degrees and separated by a 6-degree gap. The purpose in doing so is to frequency band-limit the detection area to exclude noise sources outside of the frequency of where the bulk of the combustion event is located. This is important since angular acceleration is the derivative of the angular velocity and a derivative operation is essentially a high pass filter that would otherwise magnify high frequency noise that might confound the detection of a high pressure exhaust spring. It should be appreciated that different segment lengths and gaps may be used. The calculated angular acceleration may then be latched for each cylinder in a 90-degree interval for an 8-cylinder engine. It should be pointed out that this 90-degree latching interval derives from the 720 crank angle degrees per cycle divided by the number of cylinders of the engine and does not necessarily have to be the same as 90-degree filtering window.

The torque model embodiment uses a cylinder pressure model to calculate a nominal crankshaft angular acceleration. This detection method relies on the comparison of expected angular acceleration calculated from cylinder pressure to measured angular acceleration from the crankshaft position sensor. FIG. 5 is a flow diagram illustrating the steps involved in this methodology and is described in more detail below. It should also be noted that input signal rationality checks may be performed in each module, in order to determine integrity of input signals to ensure robustness of the strategy.

An analytical cylinder pressure model based on an ideal combustion stroke of an internal combustion engine can be developed to estimate cylinder torque under a variety of operating conditions including the effects of skip fire operation. The model is applicable to many types of engine cycles, such as Otto, Atkinson, Miller, Diesel, etc., using appropriate values that characterize the combustion event. The model predicts pressure in each cylinder not only during a fired cycle, but also during skipped cycles. The modeled cylinder pressure may then used to calculate the indicated torque based on a simple crank-slider mechanism.

Figure 6:
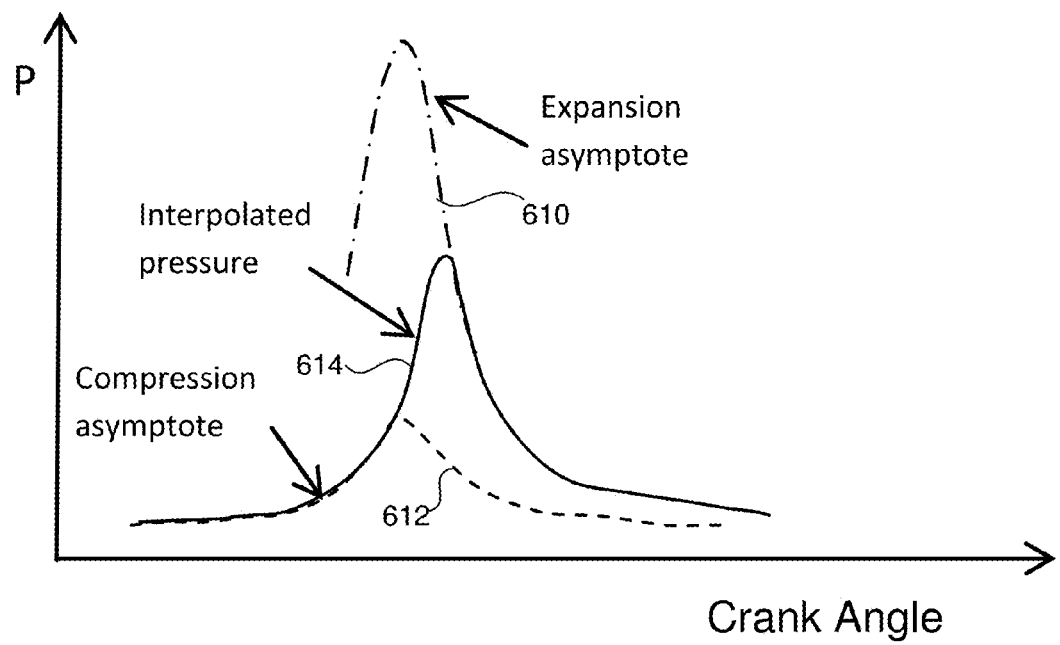
FIG. 6 shows interpolation of cylinder pressure between two asymptotes.

A main concept of the analytical pressure model assumes that the cylinder pressure $p(\theta)$ modeled as the interpolation between two asymptotic pressure traces as illustrated in FIG. 6. The compression stroke 612 is modeled by a polytropic process characterized by a polytropic exponent $k_c$ and the thermodynamic state at intake valve closing (IVC). The reference states at IVC are determined from experimental data. These traces determine the compression asymptote up until ignition. The expressions for pressure and temperature for this process are:

$$p_c(\theta) = p_{IVC}\left(\frac{V_{IVC}}{V(\theta)}\right)^{k_c} \quad (1)$$

$$T_c(\theta) = T_{IVC}\left(\frac{V_{IVC}}{V(\theta)}\right)^{k_c-1} \quad (2)$$

Figure 7:
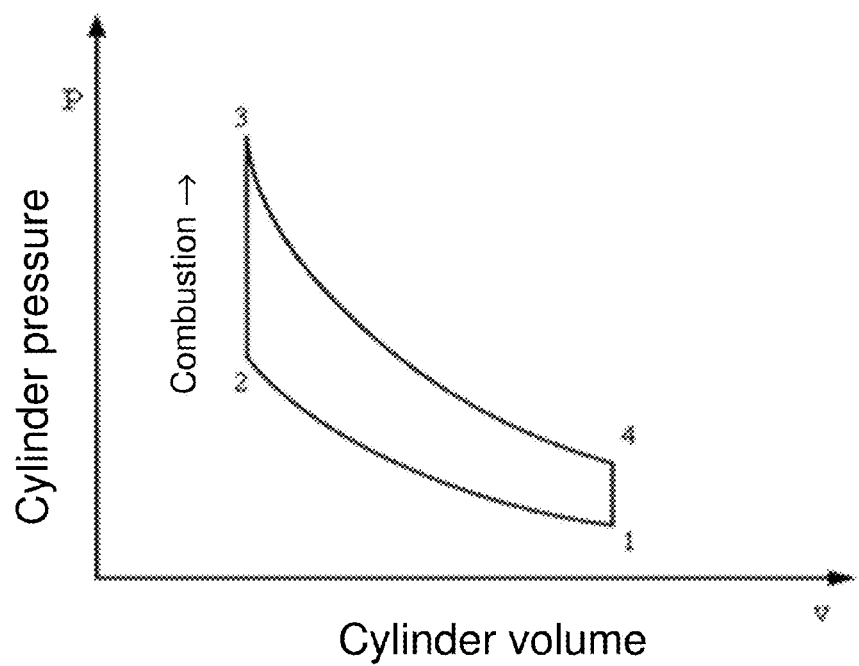
FIG. 7 shows a pressure-volume (PV) diagram for an ideal Otto cycle.

The expansion asymptote 610 is also described by a polytropic process with polytropic exponent $k_e$. The quantities $p_3$, $T_3$ and $V_3$ correspond to point 3 in the ideal Otto cycle depicted in the pressure-volume (P-V) diagram shown in FIG. 7. The modeled combustion process moves between points 2 and 3 on the P-V diagram.

$$p_e(\theta) = p_3\left(\frac{V_3}{V(\theta)}\right)^{k_e} \quad (3)$$

$$T_e(\theta) = T_3\left(\frac{V_3}{V(\theta)}\right)^{k_e-1} \quad (4)$$

The temperature rise $\Delta T_{comb}$ due to combustion is added to $T_2$ and state of $(P_2, T_2)$ can be obtained from equation (1) and (2).

$$T_3 = T_2 + \Delta T_{comb} \quad (5)$$

$$p_3 = p_2 \frac{T_3}{T_2} \quad (6)$$

$$\Delta T_{comb} = \frac{m_f q_{HV} \varepsilon}{c_v m_{tot}} \quad (7)$$

Where fuel mass $m_f$, heating value $q_{HV}$, conversion efficiency $\varepsilon$, specific heat $c_v$, and total mass $m_{tot}$ are used.

The interpolation between two asymptotes is, the interpolated pressure 614, based on the pressure ratio approach based on fitting heat release with the well-known Wiebe function described by parameter a, start of combustion angle $\theta_{soc}$, combustion duration $\Delta\theta$, and exponent m, which can be derived from experimental data. The pressure ratio is modeled by:

$$PR(\theta) = 1 - e^{-a\left(\frac{\theta-\theta_{SOC}}{\Delta\theta}\right)^{m+1}} \quad (8)$$

This can then be used for the interpolation $$p(\theta) = (1-PR(\theta)) \cdot p_c(\theta) + PR(\theta) \cdot p_e(\theta) \quad (9)$$

The procedure above provides a simple and complete model for pressure between IVC (intake valve closure) and EVO (exhaust valve opening). The pressure during gas exchange may be set to the intake manifold pressure. However, for skipped cycles, the pressure will drop below intake manifold pressure during the intake stroke. To properly model the pressure evolution during a skipped cycle, a polytropic process referenced to the exhaust valve closing (EVC) may be used. The pressure at EVC (exhaust valve closing) for firing cycles may be derived from experimental data.

$$p(\theta) = p_{EVC}\left(\frac{V_{EVC}}{V(\theta)}\right)^{k_c} \quad (10)$$

Figure 8:
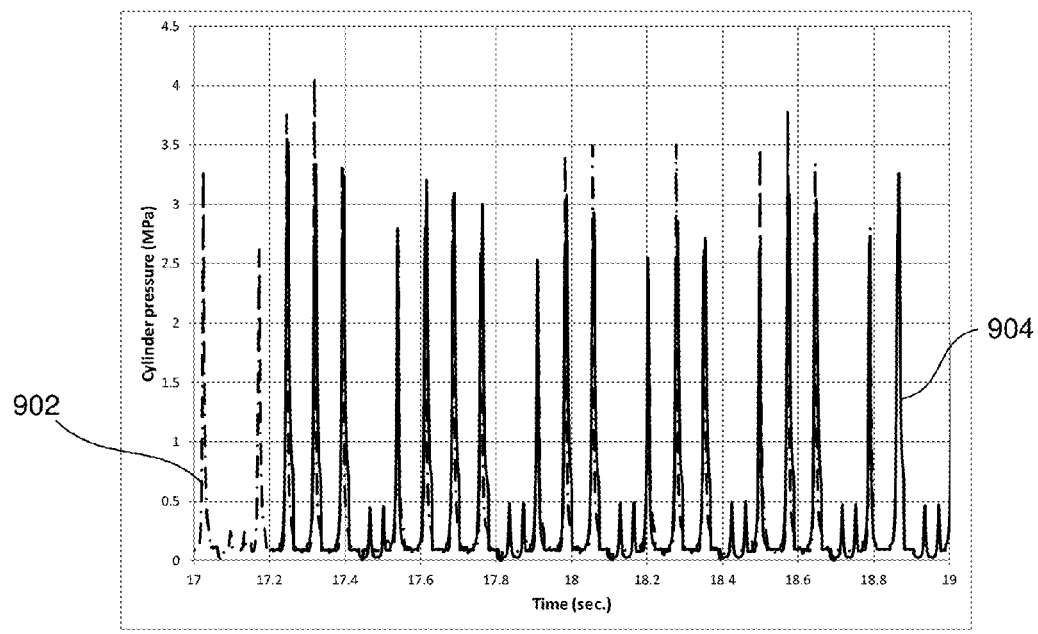
FIG. 8 shows a comparison between the measured and modeled cylinder pressure.

A comparison of the modeled cylinder pressure 904 with the measured cylinder pressure 902 is shown in FIG. 8. The pressures during skipped cycles as well as the firing cycles are captured well enough for accurate torque prediction as described next. For clarity the initial section of curve 902 (solid line) is omitted and the final section of curve 904 (dashed line) is omitted. Inspection of FIG. 8 shows that the model works well in predicting the cylinder pressure.

The gas force acting on a piston connected to the crank shaft by a rod with a crank slider mechanism produces at each instant an "indicated torque"

$$T_{cyl,i}(\theta) = (P_{cyl,i}(\theta) - P_{crank})Ar\frac{\sin(\theta+\beta)}{\cos\beta} \quad (11)$$

$$\beta = \sin^{-1}\frac{\delta + r\sin(\theta-\varphi)}{l} \quad (12)$$

$$\varphi = \sin^{-1}\frac{\delta}{(r+l)} \quad (13)$$

where $P_{crank}$, r, $\delta$, l and A are crankcase pressure, crank radius, pin offset, connecting rod length and piston face cross-section area, respectively. The resultant engine indicated torque is just sum of the contributions from each cylinder.

$$T_i(\theta) = \Sigma_{Numcyl}T_{cyl,i}(\theta) \quad (14)$$

The indicated torque may be determined using the methods described above in the Indicated Torque Module 560 (FIG. 5). Inputs to the Indicated Torque Module 560 include engine operating conditions 562, hardware parameters 564, combustion parameters 566, and a cylinder deactivation flag 568. Engine operating conditions 562 may include engine speed 572, intake manifold absolute pressure (MAP), intake manifold air temperature, air per cylinder, cam phasing, and other variables. Hardware parameters 564 may include connecting rod length, compression ratio, valve opening window, pin offset and other design parameters. Combustion parameters 566 may include injection timing, spark timing, heat release characteristics during combustion and other parameters describing the combustion details. The cylinder deactivation flag 568 describes whether a cylinder is being fired or skipped.

The indicated engine torque 574 obtained from using the cylinder pressure model by the Indicated Torque Module 560 may be used to determine crank angular acceleration in the Predicted Crank Acceleration Module 580. The engine dynamic model used for this derivation is:

$$J_{eq}\ddot{\theta} + M_{eq}r^2\left[f_1(\theta)\ddot{\theta} + f_2(\theta)\dot{\theta}^2\right]f_3(\theta) = T_i(\theta) - T_{fp}(\theta) - T_L(\theta) \quad (15)$$

where $$f_1(\theta) = f_3(\theta) = \sin\theta + \frac{r}{2l}\sin2\theta \quad (16)$$

$$f_2(\theta) = \cos\theta + \frac{r}{l}\cos2\theta. \quad (17)$$

$\theta$ is the crank angle, $\dot{\theta}$ and $\ddot{\theta}$ are the angular velocity and the angular acceleration of the crankshaft, respectively. l is the connecting rod length, and r is the crank radius. $J_{eq}$ is the moment of inertia of the crankshaft, flywheel, gear and rotating part of connecting rod, and $M_{eq}$ is the mass of the piston, rings, pin and linear motion part of the connecting rod. $T_i(\theta)$, $T_{fp}(\theta)$, and $T_L(\theta)$ are the indicated engine torque 574, friction torque 582, and load torque 576, respectively. Other inputs 578, such as accessory loads, may be considered in Eq. (15). The derivation of this equation can be found in the literature, for example Zweiri, et. al. "Instantaneous friction components model for transient engine operation", Proc. Inst. Mech. Eng. Part J. Automob. Eng. Vol. 214, no. 7 pp. 809-824, July 2000.

The crank angle $\theta$, crank angular velocity $\dot{\theta}$, and equivalent mass $M_{eq}$ may be measured, and the indicated engine torque $T_i(\theta)$ 574 are given by the model previously described. The friction torque $T_{fp}(\theta)$ 582 may be determined by a lookup table obtained from experiments which relates the crank RPM to friction torque. The combined moment of inertia of crankshaft, flywheel, gear, and rotating part of connecting rod, $J_{eq}$, may also be determined experimentally for each gear. The load torque $T_L(\theta)$ 576 may be estimated from the difference between the engine speed and turbine shaft speed through equation (18) for the torque converter and torque converter clutch. $T_p$ is the torque converter torque and $T_{tcc}$ is the torque converter clutch torque. $K_t$ is calculated by a lookup table obtained from experiments and torque converter clutch gain $K_{tcc}$ and $\alpha$ constant $\alpha$ may also be determined experimentally.

$$T_L = T_p + T_{tcc} \quad (18)$$
$$T_p = \frac{\omega_e - \omega_t}{|\omega_e - \omega_t|} \frac{\omega_e^2}{K_t^2}$$
$$T_{tcc} = K_{tcc}\tanh\left(\frac{\omega_e - \omega_t}{\alpha}\right)$$

$\omega_e$ and $\omega_t$ are the angular speed of crankshaft and turbine shaft, respectively. A discrete-time low-pass filters may be applied to $T_p$ and $T_{tcc}$ to remove high frequency components. The low-pass filter may be given by the following transfer function:

$$F(z) = \frac{b}{z - a} \quad (19)$$

where a and b are filter constants.

Equation (15) may be solved for $\ddot{\theta}$ using the measured crank angular velocity $\dot{\theta}$ via $$\ddot{\theta} = \frac{1}{J_{eq} + M_{eq}r^2 f_1 f_3}\left[-M_{eq}r^2 f_2 f_3 \dot{\theta}^2 + T_i(\theta) - T_{fp}(\theta) - T_L(\theta)\right] \quad (20)$$

When a high pressure exhaust spring occurs, the measured $\dot{\theta}$ contains the effect of the spring and strictly speaking, measured $\dot{\theta}$ should not be used to obtain $\ddot{\theta}$ from the model. But the effect is considered to be negligible for the purpose of high pressure exhaust spring detection.

The predicted crank acceleration 586 obtained by the Predicted Crank Acceleration Module 580 using the model described above may be compared with the measured crank angular acceleration 588 determined by the Measured Crank Acceleration Module 550. Measured crank acceleration 588 may be computed from the measured crank angular speed in the 6-degree angle domain, where the crank angular speed is sampled at every 6 crank angle degrees, by the following formulae to obtain the derivative and to reduce the effect of measurement noise at the same time.

$$A_{time}(n) = \frac{\frac{42}{\sum_{k=1}^{7} T_d(n-k)} - \frac{42}{\sum_{k=8}^{14} T_d(n-k)}}{\sum_{k=4}^{10} T_d(n-k)} \quad (21)$$

$$T_d(n) = \frac{6}{360 \cdot \frac{r(n)}{6}} = \frac{1}{10}\frac{1}{r(n)} \quad (22)$$

r(n) is the crank angular speed at time step n in 6 degree angle domain. The acceleration formulae (21) can also be approximated as the double average of acceleration shown below.

$$A_{rpm}(n) = \frac{\frac{1}{7}\sum_{k=1}^{7} r(n-k) - \frac{1}{7}\sum_{k=8}^{14} r(n-k)}{\sum_{k=4}^{10} T_d(n-k)} = \frac{1}{7}\sum_{k=1}^{7} \frac{1}{7}\sum_{m=0}^{6} a(n-k-m) \quad (23)$$

Figure 9:
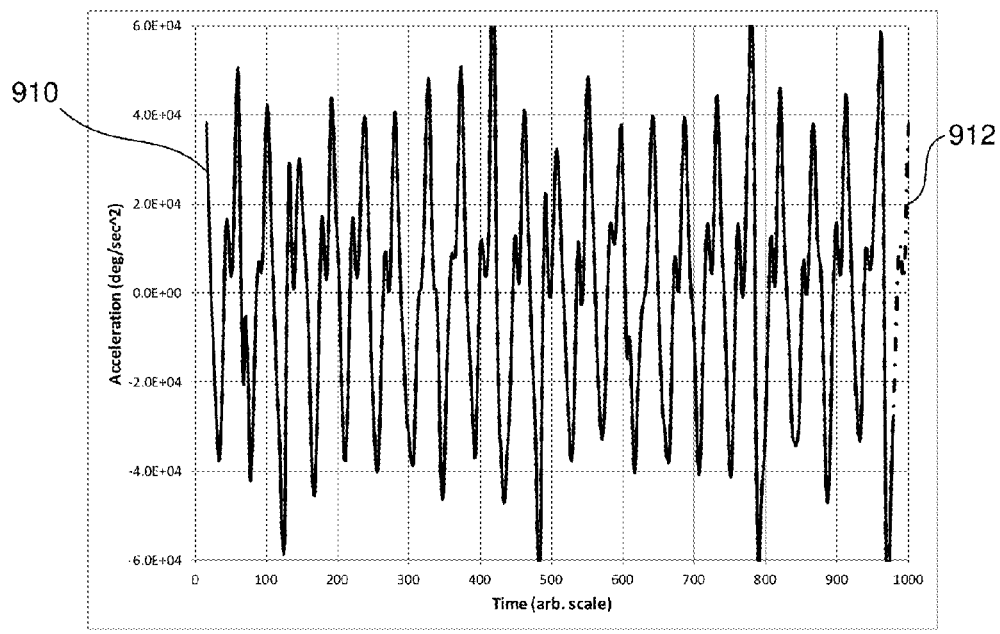
FIG. 9 shows a comparison between different averaging methods for the crankshaft acceleration.

Here the term $T_d(n)$ is treated as a constant during the time steps considered and Euler's rule is used to derive the relationship between $r(n)$ and the acceleration $a_{(n)}$. FIG. 9 plots the crank shaft acceleration versus time for an engine running under substantially steady-state conditions. FIG. 9 compares the two averaging methods, that based on Eq. (21), curve 910, and that based on Eq. (23), curve 912, applied to the same angular speed signal generated for validation purposes. The peaks in the curves 910 and 912 correspond to cylinder firings and the dips correspond to skipped firing opportunities. For clarity the initial section of curve 912 (dashed line) is omitted and the final section of curve 910 (solid line) is omitted. Inspection of FIG. 9 illustrates that the difference between the two methods is negligible. This comparison demonstrates that the acceleration obtained from the engine dynamics model can be filtered in 6-degree domain and can be compared with the measured acceleration obtained from Eq. (21).

A high-pass filter may then be applied to both measured and modeled accelerations. The high-pass filter removes the mean value offset errors in the acceleration estimate, making it easier to compare the characteristics of the measured and simulated accelerations relevant for high pressure exhaust spring detection. The high-pass filter simply removes any dc difference between measured and modeled acceleration, which may be due to variations in the load or other torques. The high-pass filter may be given by $$y(z) = -a_1 y(n-1) - a_0 y(n-2) + b_2 x(n) + b_1 x(n-1) + b_0 x(n-2). \quad (24)$$

where $a_0$, $a_1$, $b_0$, $b_1$, and $b_2$ are the appropriate filter coefficients determined by experimental data.

A HPES Detection Module 590 may be used to compare the measured crankshaft rotational acceleration 588 to the predicted crankshaft rotational acceleration 586 during a time window associated with a normal exhaust valve opening. A metric can be devised based on a number of different methods comparing the difference between the measured crankshaft rotational acceleration 588 and the predicted crankshaft rotational acceleration 586, and if the metric exceeds a threshold, a fault-detected signal 592 may be sent to a safety circuit or some other engine control component to deactivate the intake valve or to activate the exhaust valve before opening the intake valve, until a high pressure exhaust spring is no longer present in the cylinder under test.

A comparison of the measured crankshaft rotational acceleration 588 to the predicted crankshaft rotational acceleration 586 during an exhaust stroke can also be used to diagnose other types of exhaust valve actuation faults as well. For example, if the exhaust valve timing (e.g., the time that the valve actually opens) is off—the measured torque/crankshaft rotational acceleration will have a corresponding signature that is measurably different than the estimated torque/crankshaft rotational acceleration profile. Similarly, variations in the valve opening dwell time (i.e., the time that the valve is actually open) will also result in distinct crankshaft rotational acceleration profiles that can be detected. Therefore various possible exhaust valve actuation faults (e.g., valve timing errors, valve lift errors, etc.) can be identified—or flagged as possible problems—by comparing actual crankshaft rotational acceleration to a torque model predicted crankshaft acceleration.

Although exhaust valve actuation faults and misfires/non-fires tend to have the greatest impact on net engine torque, intake valve actuation faults can also be identified by comparing the actual crankshaft rotational acceleration profile to a predicted crankshaft rotational acceleration profile. For example, if an intake valve fails to open when it is supposed to during an active (fired) working cycle, the resulting torque/rotational acceleration profile will be very different than a normal firing and most intake valve faults therefore can be identified. The nature of this difference can be seen by comparing lines 85 and 87 in FIG. 2. Line 85, which shows the torque profile associated with a normal working cycle, is quite different than the torque profile associated with a low pressure exhaust spring (line 87)—which is the result of a failed or deactivated intake. As can be seen, there is a relatively small torque difference during the intake stroke itself. The difference is greater during the compression stroke. The differences during the combustion/expansion stroke are much more extreme since no combustion occurs during a LPES. Thus, intake valve actuation faults can also be detected using the torque model based approach. For direct injection engines, it can be particularly desirable to identify an intake valve opening fault before fuel is injected into the cylinder—so that a safety routine can disable the delivery of fuel to the cylinder during the defective working cycle.

The crankshaft speed and rotational acceleration can be detected using a conventional crankshaft speed sensor that monitors the rotational speed of a crankshaft. Alternatively, a similar sensor may be arranged to sense the rotational speed of the flywheel or at any other location that can accurately detect crankshaft rotational speed and/or acceleration. Alternatively a crankshaft torque sensor can be used to determine the crankshaft torque which can be directly compared to the estimated crankshaft torque without requiring translation between the torque and rotational acceleration/speed domains.

As described in incorporated U.S. Pat. No. 9,399,963 and U.S. Patent Application No. 61/897,686, the number of cylinders actually considered in the model can vary based on the type of fault that is being identified and the expected operating conditions. For example, as can be seen in FIG. 2, the torque impact of the combustion stroke during a fired working cycle and the impacts of high pressure exhaust springs (both compressions and expansion) tend to be dramatically higher than the impacts of other strokes. Therefore, the model can sometimes be simplified by only considering the torque contributions of a subset of cylinders that could potentially have a combustion stroke during the analyzed window and any cylinders that are expected to contain a high pressure exhaust spring during the analyzed window. This type of simplification is particularly applicable when the event being analyzed has a large torque impact such as an unexpected high pressure gas spring or a misfire/non-fire. As more precise estimates are necessary to identify or characterize the fault, it is typically desirable to consider the impacts of more of the other cylinders in the torque model.

Crankshaft Speed Sensor (Without Torque Model)

In some embodiments the determination of a HPES may be made by measuring the crankshaft jerk over a time window in the vicinity of the first TDC after failure of an exhaust valve to open following a combustion event. Inspection of FIG. 2 shows that the torque produced by a HPES cylinder changes rapidly at TDC 91 and is much different than the torque produced by the other cases. The engine speed and various time derivatives of the engine speed in the vicinity of TDC 91 may be determined using a crankshaft speed sensor. The sensor may determine the engine speed by measuring the lapsed time between reference marks on the crankshaft passing a fixed reference point. The crankshaft reference marks may be equally distributed around the crankshaft at approximately 6° degree intervals. The average engine speed over that 6° degree crankshaft interval can thus be determined.

An exemplary implementation of this method of determining a HPES is shown in FIG. 4. Two sequential measurements of the crankshaft rotation speed may be made for period 1 and period 2 prior to the crankshaft reaching TDC. Two sequential measurements of the crankshaft rotation speed for periods 4 and 5 may also be made after TDC. These measurements may be spaced by a gap, period 3. From the measurements prior to TDC a crankshaft acceleration can be calculated by determining the change in crankshaft rotational speed between period 1 and period 2. Similarly, from the measurements after TDC crankshaft acceleration can be calculated by determining the change in crankshaft rotational speed between period 4 and period 5. Comparison of these two acceleration values allows determination of the change in the crankshaft acceleration between these two intervals, the differential crankshaft acceleration. If the period 3 is set equal to zero, the measurement represents the crankshaft jerk (time derivative of the acceleration). For cases where period 3 is non-zero, the resultant value is related to jerk, but not precisely this quantity. This quantity may be defined as the HPES detection metric as shown in FIG. 4. It should be appreciated that the timing windows and their placement relative to TDC are exemplary only. In FIG. 4 the timing window is 90°, in practice the timing window may be larger or smaller. In FIG. 4 the periods 1-5 are all shown as being 18°, corresponding to the passing of 3 references marks on the crankshaft. The periods 1-5 need not be this length and they do not necessarily need to have equal lengths. Periods 1 and 2 and periods 4 and 5 need not be sequential. In some cases the number of measurement periods may not be equally distributed around TDC. In some cases period 3 can be deleted and period 2 and 4 combined to reduce the number of measurements. In some cases a differential crankshaft velocity, the difference in velocity between two non-sequential time intervals, may be used in calculating a HPES detection metric. In a multi-cylinder engine a measurement of the type described above may be performed on each cylinder in the vicinity of the TDC corresponding to the beginning of a normal intake stroke.

The HPES detection metric calculated above may be compared to a threshold value determined based on the engine parameters, such as speed (RPM), air change per cylinder (APC), and the firing/skip information of each cylinder. Since the impact of the high pressure exhaust spring on crankshaft rotation is most pronounced in the vicinity of the second TDC 91, as seen in FIG. 2, the comparison of HPES metric to the threshold may be made during the time window where the opposing cylinder is near its Combustion TDC. The opposing cylinder may be described as follows. Consider, for example, a four stroke engine, in which the two engine revolutions take place for every engine cycle. In such a design, when a target firing opportunity is available at a target cylinder (e.g., when the piston for the target cylinder is at TDC at the beginning of a power stroke), there is another cylinder whose piston is generally in the same position (e.g., the piston for another cylinder is also at TDC). This other cylinder may be referred to as the opposing cylinder. In this example involving a four stroke engine, the opposing working chamber is one revolution away or 360 degrees apart from the target cylinder.

In this embodiment, it is necessary to take into account whether the firing opportunity for the opposing cylinder is a skip or a fire. The skipping or firing of the opposing cylinder can substantially influence the crankshaft angular acceleration or jerk, and therefore can significantly influence the threshold value (expected nominal value of HPES metric without faults). Additionally, skipping or firing of temporally adjacent cylinders can also have a substantial effect on the measured crankshaft angular acceleration for a particular firing or skipping event, as described in the incorporated '109 and '686 applications, therefore, it may be desirable to also take into account at least one firing opportunity that immediately precedes the opposing cylinder firing opportunity and at least one firing opportunity that immediately follows the opposing cylinder firing opportunity. In this exemplary implementation, the threshold for detecting high pressure exhaust spring fault can be determined from one of the eight (8) categories listed in Chart A based on the skip/fire determination of the opposing cylinder and its neighboring cylinders.

CHART A

| Group number | Group Description based on Firing Opportunity | | |
|---|---|---|---|
| | Cylinder preceding Opposing Cylinder | Opposing Cylinder | Cylinder following Opposing Cylinder |
| 0 | Skip | Skip | Skip |
| 1 | Skip | Skip | Fire |
| 2 | Skip | Fire | Skip |
| 3 | Skip | Fire | Fire |
| 4 | Fire | Skip | Skip |
| 5 | Fire | Skip | Fire |
| 6 | Fire | Fire | Skip |
| 7 | Fire | Fire | Fire |

In still other implementations, all firing opportunities over a complete engine cycle, i.e. 720° of crankshaft rotation, may be used to establish the HPES metric thresholds. Put another way, assuming that the high pressure exhaust spring determination for a target working chamber is based on a measurement of an engine parameter (e.g., crankshaft angular acceleration or jerk) during an assigned window, the HPES determination and/or the metric threshold can be based at least in part on the firing commands for all other cylinders.

Proximity Sensors

Provisional Applications 61/879,481 filed Sep. 18, 2013 (TULAP031P), and 61/890,671 filed Oct. 15, 2013 (TULAP031P2), which are incorporated herein by reference, describe the use of proximity sensors to determine whether a valve has opened properly. In some embodiments, a proximity sensor is positioned adjacent each monitored valve. The proximity sensors are able to monitor small movements of the valve and therefore the sensor's outputs can provide a signal representative of valve actuation (i.e., opening and closing) as well as the dwell time that the valve is open. Thus, monitoring of the proximity sensor output can reliably identify when a valve (which may be either an exhaust valve or an intake valve) has opened properly. A variety of different types of proximity sensors may be used, although their associated capabilities, sensitivities and costs will vary with the specific sensors selected. By way of example, Hall Effect sensors, Eddy-Current sensors, a magnetic reed sensor, a proximity sensing coil (e.g. induction coil) or other proximity sensing devices may be used. The physical location of the sensors may also be varied, so long as the sensor can detect movements that reliably indicate valve actuation. For example, the sensors may be positioned to detect the position or movement of the valve itself, movement of a valve lifter, the position of a cam that drives the valve, etc.

In some specific implementations, a Hall effect sensor may be arranged to change its output voltage in response to the position of a magnet mounted on the moving valve. In other implementations, a magnetic reed sensor may be arranged to make (or break) electrical contact between two wires in the presence (or absence) of a magnetic field. As with the Hall effect sensor, the motion of a magnet mounted on a moving valve will result in an oscillatory output of both sensors, which can be used to determine whether the magnet is proximate to the sensor. In still other implementations, an induction coil sensor may be composed of a coil of wire or a spiral type conductive pattern on a printed circuit board. The induction coil may be incorporated as part of an inductive-capacitive (LC) tank circuit whose electrical properties, such as the circuit resonant frequency, change depending on the circuit inductance. The circuit inductance changes as a function of the valve position relative to the sensor, since the valve is formed from a magnetic material. Thus the position of the valve can be inferred. Independent of the sensor type, signals from all or a group of the sensors on a multi-cylinder engine may be multiplexed together and directed to the ECU and/or some other engine control or diagnostics element.

Generally, the detection of exhaust valve actuation faults is viewed as more important than the detection of intake valve actuation faults. Therefore, in an effort to reduce costs, it may be desirable to only provide proximity sensors for the exhaust valves in some circumstances. In others, applications proximity sensors can be provided for both intake and exhaust valves. In some cases a single proximity sensor may be positioned between two exhaust valves on adjacent cylinders, such that a single sensor can detect motion of both valves. A similar configuration may also be used with two intake valves.

Cylinder Gas Monitoring

In another approach, the detection of selected properties of the gases within a cylinder may be used to infer whether an exhaust or intake valve has opened properly. For example, one effective way to determine the nature of the gases within the cylinders at any time is to provide a pressure sensor for each cylinder to directly monitor the cylinder pressure. As can be appreciated by reference to FIG. 1, the pressure within the cylinder at any given time and/or the changes in cylinder pressure over a small window of time is highly indicative whether a high pressure spring 102, a low pressure spring 104 or an air spring 106 is present in the cylinder and is a very good indicator of the valve actuation status. Although pressure sensors work well for this purpose, they are not standard components in commercially available engines, and adding such pressure sensors is not always practical. Therefore, the Applicant has developed several other approaches to detecting the nature of the gases within a cylinder.

Various electrical characteristics of cylinder gases are quite different when combusted exhaust gases remain trapped in the cylinder, compared to when the combusted gases have been exhausted, and/or when an air charge is present in the cylinder. Thus, a monitoring circuit may be provided to monitor selected electrical characteristics of the gases within the cylinder at selected times during a working cycle. The resulting information can be used to infer whether the exhaust valve opened to release the exhaust gases. Many internal combustion engines already have an electrical component present in the combustion chamber in the form of a spark plug which can be used to monitor certain characteristics of the cylinder gases.

By way of example, Provisional Application No. 61/925,157 filed Jan. 8, 2014 (TULAP037P), which is incorporated herein by reference, describes several arrangements for monitoring electrical properties of gases in the region of a spark gap to infer the conditions within a cylinder, which in turn can be used to infer whether an exhaust or intake valve has opened properly. In some embodiments, an auxiliary electrical circuit added to the normal electrical circuit used to drive the cylinder spark is arranged to monitor electrical characteristics across a spark plug's spark gap. The measured electrical characteristics may be a voltage drop, a current leakage, ionization level, etc.

In some particular embodiments, a test spark (i.e., a spark that is not intended to initiate combustion) is ignited across the plug's spark gap at selected times when uncombusted air and fuel is not in the cylinder. During a spark event, there will typically be a step change in the voltage across the gap. When low pressure is present within the cylinder, the voltage may go down during the spark event. In contrast, if a high pressure is present in the cylinder (which can be due to either a high pressure spring or a cylinder fire), the voltage across the spark gap may go up during a spark event. Therefore, monitoring the voltage drop across the spark gap during a test spark can be used to determine the nature of the cylinder's contents at the time of the test spark. One suitable time for conducting the spark test is when a piston approached top dead center during an exhaust stroke since the pressure is highest at that time. However, as previously mentioned, in some implementations it will be desirable to test earlier in the exhaust stroke to provide sufficient time to deactivate an intake valve in response to the detection of an unexpected high pressure exhaust spring.

Figure 10A:
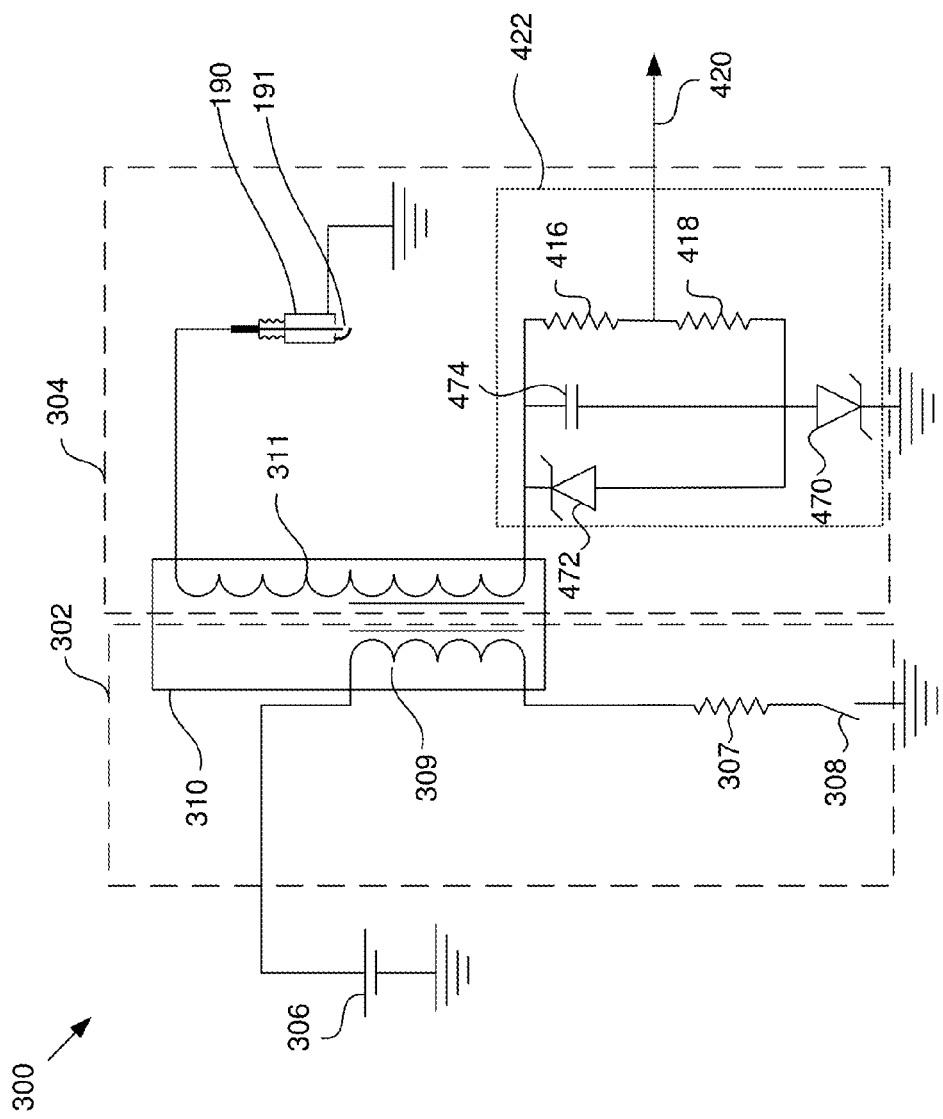
FIG. 10(a) is a simplified electrical schematic according to one embodiment of the present invention.

A few particular auxiliary circuits are described in the '157 application which is incorporated herein by reference. Yet another possible auxiliary circuit is illustrated in FIG. 10(a) of the present application. FIG. 10(a) shows an exemplary electrical circuit 300 that may be used to both drive the cylinder spark and measure the electrical properties of the cylinder gases. Each cylinder in a multi-cylinder engine may be equipped with an electrical circuit identical or similar to simplified electrical circuit 300, although this is not a requirement. Electrical circuit 300 can be divided into a primary section 302 and a secondary section 304. A switch 308 controls current flow from a battery 306 through the primary coil 309 of transformer 310. The switch may be a fast activating, solid state component such as a field effect transistor. Opening the switch 308 causes a rapid drop in the current through the primary coil 309 of transformer 310. This current may be limited by optional resistor 307, the resistance of the primary coil 309, or other factors. The sudden drop in current through primary coil 309 generates a high voltage on the secondary coil 311 of transformer 310. The high voltage appears across spark gap 191 of spark plug 190 causing electrical breakdown and generating a spark across the spark gap 191 that initiates combustion in cylinder. As mentioned earlier, a test spark may also be generated at other times in an engine cycle for sensing properties of gases within the cylinder.

Figures 10B, 10C:
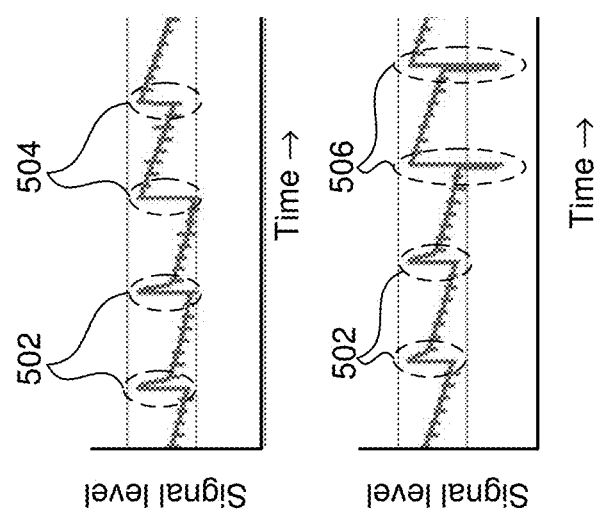
FIGS. 10(b) and 10(c) are signal waveforms according to one embodiment of the present invention.

Secondary section 304 includes an auxiliary monitoring circuit 422. In the illustrated embodiment, auxiliary circuit 422 contains two resistors 416 and 418, which form a voltage divider. In addition auxiliary circuit 422 contains two diodes, diode Zener 470 and Zener diode 472 and a capacitor 474. The Zener diode 472 may have a breakdown voltage in the range of 600 to 800 volts, although higher and lower voltages may be used. Zener diode 472 may consist of a series of individual Zener diodes. A signal 420 may be taken between the two resistors 416 and 418 and directed to an engine controller (not shown) or used in some manner to determine status within a cylinder. In particular, the change in the signal 420 during a spark may be used to infer the presence of a high or low pressure spring in the cylinder. The presence of high pressure in the cylinder, either from a high pressure exhaust spring or a combustion event, may be detected by a positive change in the voltage of signal 420. The presence of low pressure within the cylinder may be detected by a negative change in the voltage of signal 420. In other cases the sign of the change in the voltage of signal 420 may be similar, but the magnitude of the change may be different such that a high or low pressure spring may be detected. Variation in the voltage of signal 420 may be in the range of 50 to 100 V, although higher and lower changes may occur depending on the detailed implementation. In other cases more complex waveform signatures may be associated with the different cylinder conditions. FIG. 10(b) shows signal the level of signal 420 (FIG. 10(a)). The waveform associated with two normal firings 502 followed by two skips with a LPES 504. FIG. 10(c) shows the level of signal 420 with two fires 502 followed by two skips with a HPES 506. Inspection of the FIGS. 10(b) and 10(c) illustrates that the waveforms associated with these different cylinder scenarios are distinct. The differences in the waveforms can be sensed and incorporated into a circuit to detect the current cylinder status.

Figure 11:
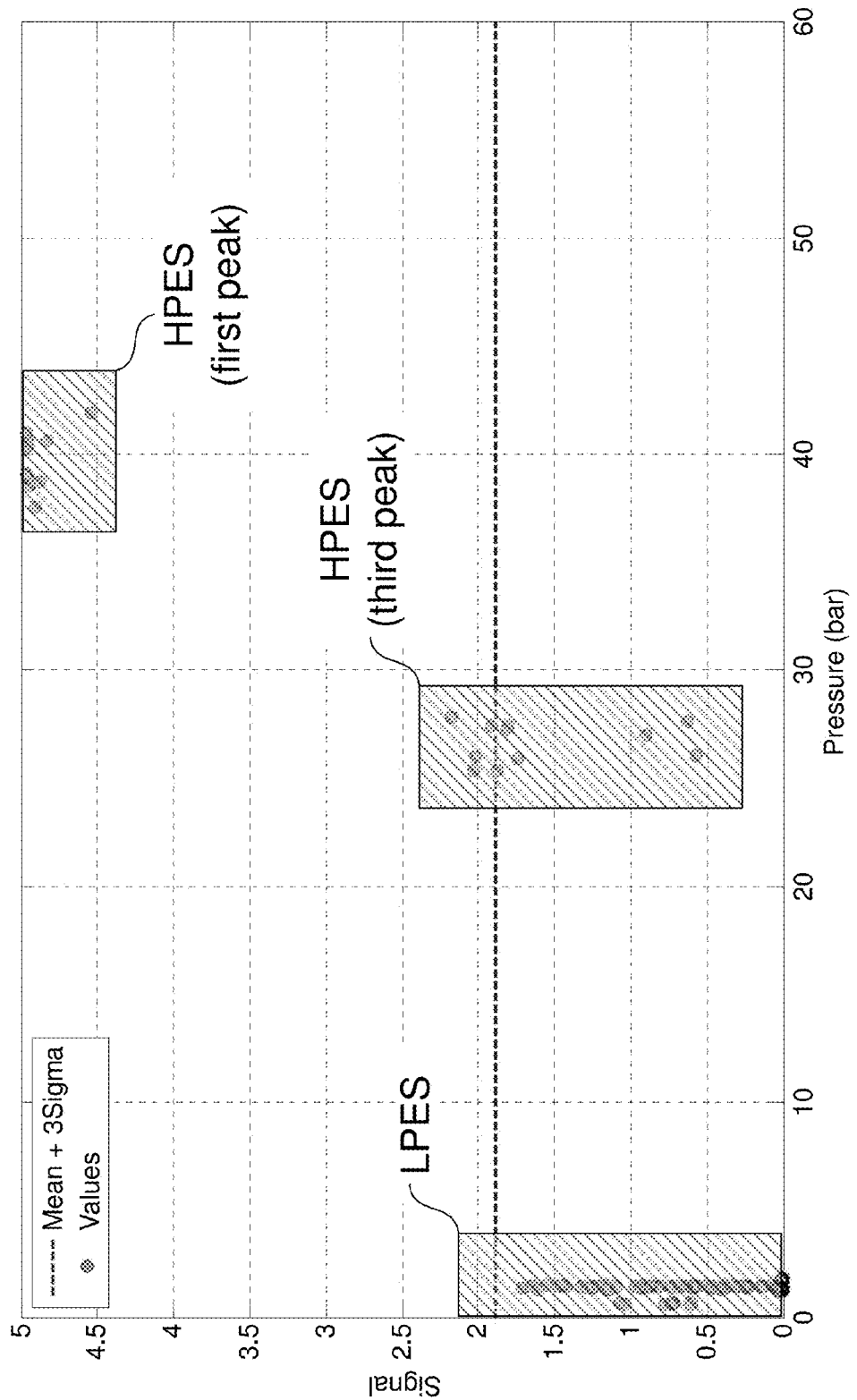
FIGS. 11 and 12 are graphs showing the ionization level of combusted gases in a cylinder during selected operating conditions.
Figure 12:
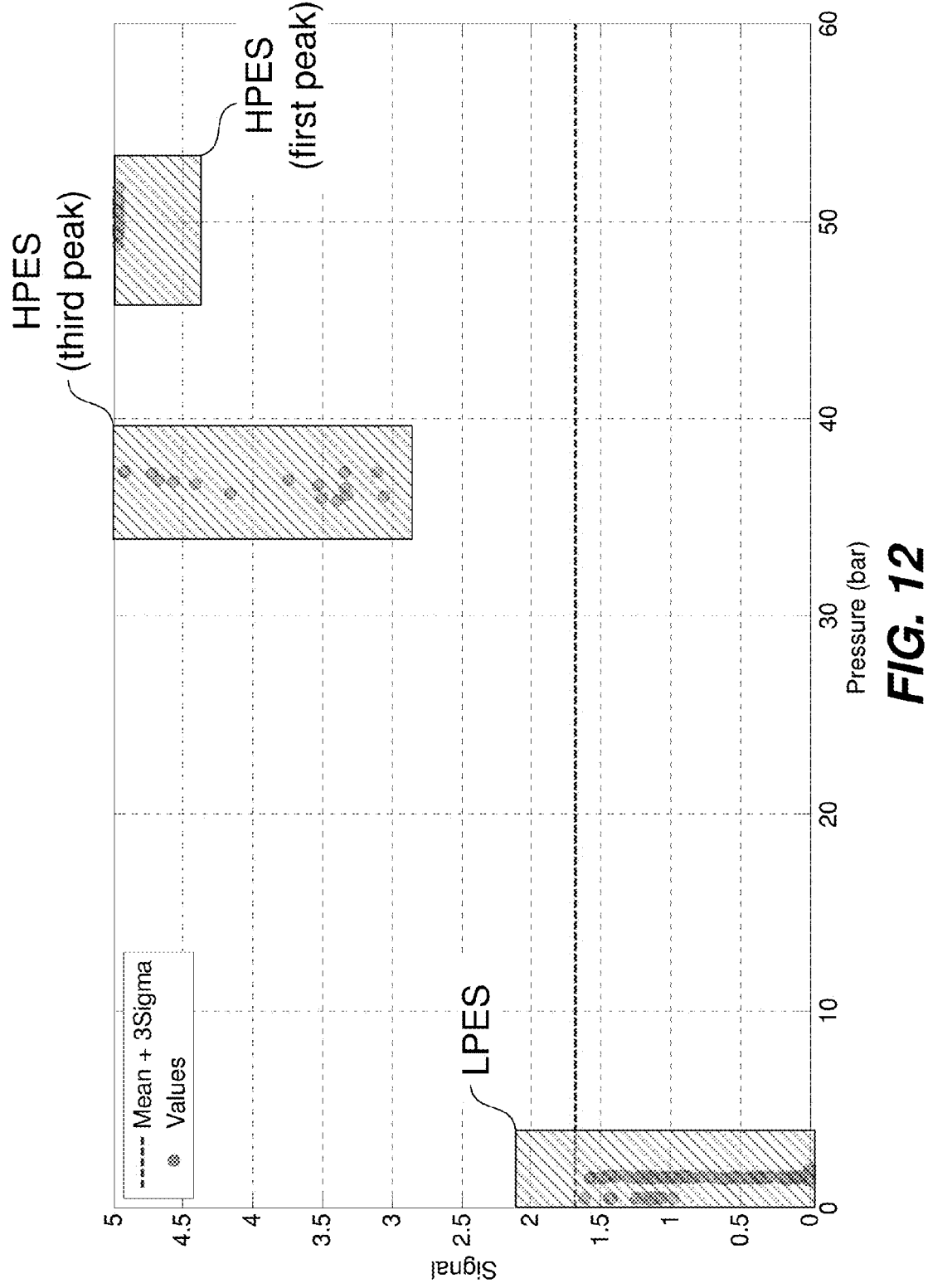

Yet another cylinder gas monitoring approach takes advantage of the fact that high temperature/high pressure exhaust gases tend to be ionized and therefore electrically conductive. Thus, the nature of the gases in the cylinder can be inferred by directly or indirectly detecting the relative ionization level of gases in the cylinder. FIGS. 11 and 12 illustrate the nature of this difference. Specifically, FIGS. 11-12 plot the ionization level and pressure level within a cylinder under different operating conditions (i.e. at different engine speeds and cylinder mass air charge (MAC)) as detected by an ion sensing coil. FIG. 11 corresponds to an engine speed of 1000 revolutions per minute (rpm), while FIG. 12 corresponds to a higher engine speed of 1750 rpm. FIG. 11 corresponds to a MAC of 550 mg, while FIG. 12 corresponds to a higher cylinder load of a 610 mg MAC. The upper $3\sigma$ ($\sigma$=standard deviation) value of the LPES signal distribution is also plotted.

As can be seen from these graphs, there are significant differences in ionization level between high pressure exhaust springs and low pressure exhaust springs. In FIGS. 11 and 12, the data points labeled "HPES First Peak" represent the ionization level observed as a piston approaches top dead center of the "exhaust" stroke immediately following a firing when the exhaust valve is held closed thereby resulting in a high pressure exhaust spring. In contrast, the data points labeled "LPES" represent the ionization level observed at the same piston location when the exhaust gases are discharged in a normal manner—which is reflective of the conditions during a low pressure exhaust spring. The differences in the ionization levels associated with high and low pressure exhaust springs can be seen by comparing the HPES First Peak data points to the LPES data points. In both figures there is a clear offset between the HPES First Peak data points and upper 36 value of the LPES distribution allowing virtually unambiguous sensing of a HPES.

The data points labeled "HPES Third Peak" represent the ionization level observed in a high pressure exhaust spring one working cycle (two piston reciprocations) after the HPES First Peak. As can be seen by comparing the HPES First Peak data points to the HPES Third Peak data points, the ionization level tends to decay during subsequent reciprocations of the engine in a generally predictable way based on engine operating conditions. There is less decay in the HPES Third Peak data points in FIG. 12 than in FIG. 11 because the engine speed is greater in FIG. 12 and thus there is less time for decay between subsequent engine cycles.

Since, the ionization level associated with exhaust gases in a high pressure exhaust spring will be significantly higher than the ionization level of the cylinder gases associated with a low pressure gas spring or an air spring, the presence or absence of a high pressure gas spring can be detected by monitoring ionization levels or current leakage across the spark gap. The ionization levels may be detected using ion sensing coils or any other suitable ion sensors.

Intake and Exhaust Monitoring

The opening and closing of valves also has an impact on the nature and/or conditions of the gases in the intake and exhaust systems. Therefore, a variety of intake and exhaust gas related sensors can also be used to help monitor valve actuations. These sensors include, but are not limited to, intake manifold pressure sensors, intake manifold air flow sensors, exhaust gas oxygen sensors, exhaust manifold pressure sensors, and exhaust gas flow sensors. Some of these sensors are already standard components on some modern vehicles, so using their data to help monitor valve actuations incurs little additional expense.

On the exhaust side, the pressure within the exhaust manifold will vary with each exhaust event. The nature of these pressure swings tends to be amplified during skip fire operation due to the less frequent occurrence of exhaust events and the larger volume of gases that are typically discharged with each exhaust event. Therefore, fluctuations of the pressure within the exhaust manifold sensed by an exhaust manifold pressure sensor can be monitored to reliably indicate when exhaust events are occurring and/or have occurred. The exhaust gas pressure fluctuations tend to be greatest in the exhaust manifold(s) and in the exhaust pipes immediately adjacent the exhaust manifold. However the pressure fluctuations progress through the exhaust system in a consistent manner so the outputs of exhaust gas pressure sensors deployed at a variety of locations within the exhaust system may be analyzed to identify exhaust valve actuations and to help detect valve actuation faults. The further downstream the pressure sensors are located in the exhaust system, the larger the time delay between an exhaust valve actuation and the detection of the associated pressure rise—which can make downstream pressure sensors less useful for detecting exhaust valve actuation faults rapidly enough to deactivate a corresponding intake valve in the immediately following working cycle. However, pressure sensors in the exhaust manifold and exhaust pipes adjacent the exhaust manifold (e.g., the Y-pipes used in some exhaust systems) typically can detect the pressure surge associated with an exhaust event (or lack thereof) rapidly enough to facilitate disabling following intake valve activations. Convenient locations for exhaust pipe pressure sensor include positions where other sensors (e.g. oxygen sensors) are already deployed, including positions adjacent or integrated with exhaust gas catalysts.

Figure 15:
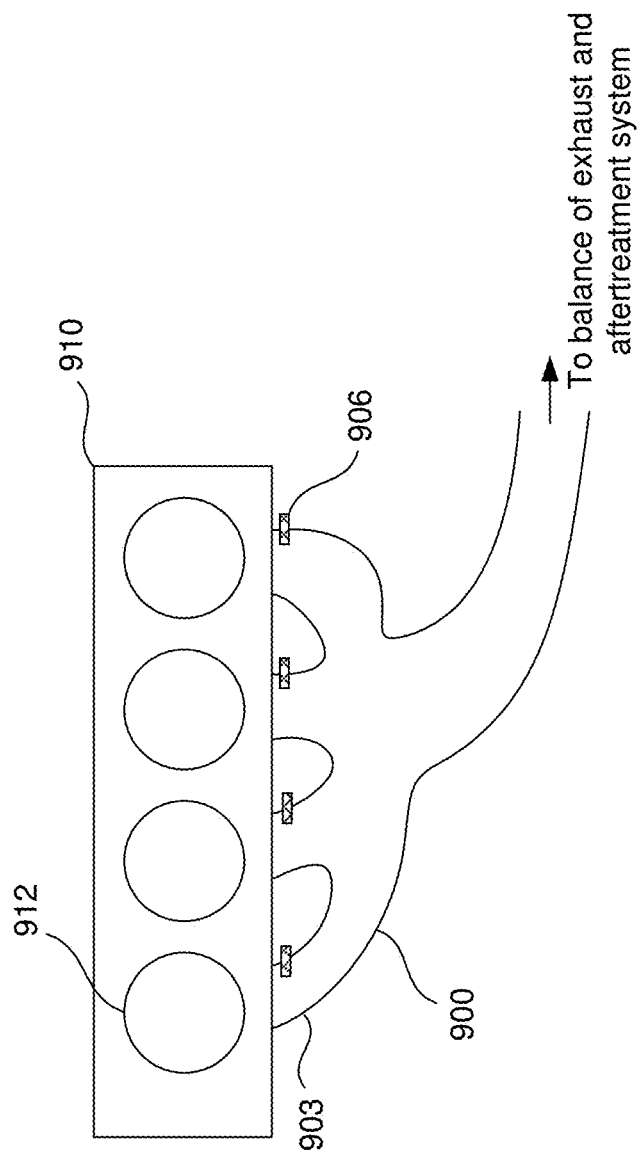
FIG. 15 illustrates a representative exhaust manifold having runners with a pressure sensor in each of the individual cylinder runners.

Within the exhaust manifold, the pressure fluctuations occur first, and are typically the most pronounced in the individual cylinder exhaust manifold runners that extend between the engine block and manifold sections where the exhaust gas flow from multiple cylinders combine. Therefore, in some embodiments, pressure sensors are provided in the exhaust manifold runners—preferably with a pressure sensor being provided for each cylinder in a corresponding individual cylinder exhaust runner section. By way of example, some suitable locations for runner based exhaust gas pressure sensors are illustrated in FIG. 15. FIG. 15 illustrates a portion of an engine exhaust system. The engine exhaust system includes an engine 910 having a plurality of working chambers 912. The working chambers may be cylinders. Associated with each working chamber is an exhaust runner 903, which receives exhaust gas vented by the working chamber. A pressure sensor 906 may be situated in each runner 903. Exhaust runners 903 direct exhaust gases into an exhaust manifold 900. Downstream of the exhaust manifold 900 is the balance of the exhaust and aftertreatment system, which may include one or more oxygen sensors, exhaust gas temperature sensors, exhaust gas pressure sensors, and catalytic converters. One such oxygen sensor 908 is illustrated although it should be appreciated that may exhaust systems utilize more than one oxygen sensor.

It should be appreciated that exhaust manifolds have a very wide variety of different geometries and runner configurations and that the optimal location for runner based exhaust gas pressure sensors will vary widely based on the nature and geometry of the runners. Most engines do not currently utilize runner based exhaust gas pressure sensors. Therefore, a potential drawback of using individual cylinder runner based exhaust gas pressure sensors is the additional costs involved in providing such sensors. However, runner based exhaust pressure sensors offer several advantages. Initially, since the runners are typically the first part of the exhaust manifold that the exhaust gases enter after leaving the cylinder exhaust ports, positioning the pressure sensors in the runners allows exhaust events to be detected more quickly than pressure sensors located further downstream in the exhaust manifold or exhaust system—which facilitates quicker detection of potential faults. The signals provided by individual cylinder runner pressure sensors also tend to be "cleaner" or carry more information than signals from pressure sensors located downstream due to their proximity to the cylinders, less damping of the pressure wave, and the fact that individual cylinder runners generally experience less influence from other cylinders than components located further downstream. The cleaner signal is particularly useful when trying to identify exhaust valve actuation faults that are more subtle than the total failure of an exhaust valve to activate after a combustion event. Such other faults include valve lift faults where the valve does not lift the desired amount, valve timing faults where the timing of the opening and closing of the exhaust valve varies from the intended time, and failure to deactivate faults associated with skipped firing opportunities.

Furthermore, runner based exhaust gas pressure sensors can be used for other purposes such as improving combustion and emissions control based on knowledge of exhaust gas pressure on a cylinder by cylinder basis. Therefore, there are some applications where runner individual cylinder runner based pressure sensors will be justified and can be used in valve fault detection in the described manner.

Some exhaust manifolds have pipe sections that combine the exhaust gas flows from more than one cylinder, but less than all of the cylinders associated with that manifold. In other embodiments, exhaust gas pressure sensors can be provided in such sections to reduce the required number of pressure sensors while providing quicker/less damped detection of exhaust events relative to detection further downstream in either the exhaust manifold or other components of the exhaust system.

Exhaust gas flow sensors can be used in an analogous manner to the described exhaust gas pressure sensors to ascertain whether a cylinder has been vented.

In still other embodiments, the output of one or more exhaust gas oxygen sensors may be used to help infer valve actuations. Specifically, when the oxygen sensors have a sufficiently fast response time, the oxygen content of individual exhaust gas pulses can be detected and associated with specific exhaust events. In general, combusted air charges tend to have unique oxygen content profiles due to slight differences in the air/fuel ratios associated with specific cylinder/working cycle firings. Therefore, the oxygen sensors output can be used to identify the passage of exhaust pulses which in turn correspond to valve actuations and the absence of an expected gas pulse indicates an exhaust valve actuation fault. An advantage of analyzing oxygen sensor output signals to monitor exhaust valve actuations is that many modern exhaust systems already utilize oxygen sensors for emissions control purposes so their data can be used at relatively little marginal costs, except that more responsive sensors may be required in some implementations.

Although exhaust gas pressure and oxygen sensors have been described primarily in the context of monitoring exhaust valve actuations, un-combusted air charges passing through the cylinders can also be readily detected by such sensors. Specifically, if the intake and exhaust valves both fail to deactivate as intended in conjunction with a skipped working cycle, then an un-combusted air charge will be pumped through the engine and out the exhaust which can have negative implications from both emissions and fuel efficiency standpoints. Oxygen sensors (aka lambda sensors), which are present in most vehicle engines today are particularly well adapted for detecting such unintended un-combusted air charges and are therefore are well suited for use in detecting failure to deactivate faults. As suggested above, exhaust pressure sensors—and particularly runner based exhaust pressure sensors can be used for this purpose as well either alone or in combination with the oxygen sensors.

On the intake side, intake manifold pressure and air flow will vary with each intake event. Therefore, intake manifold pressure sensors and/or intake manifold air flow sensors may be used to monitor intake valve actuations in substantially the same manner. In different embodiments, a single intake manifold pressure and/or flow sensor may be provided or such separate sensors may be provided in the intake manifold runners. Although runner based intake manifold pressure and/or flow sensors may be used, they don't provide the same level of advantage as runner based exhaust manifold pressure sensors and therefore it is expected that most implementations would utilize a single pressure/flow sensor for each intake manifold.

Figure 16:
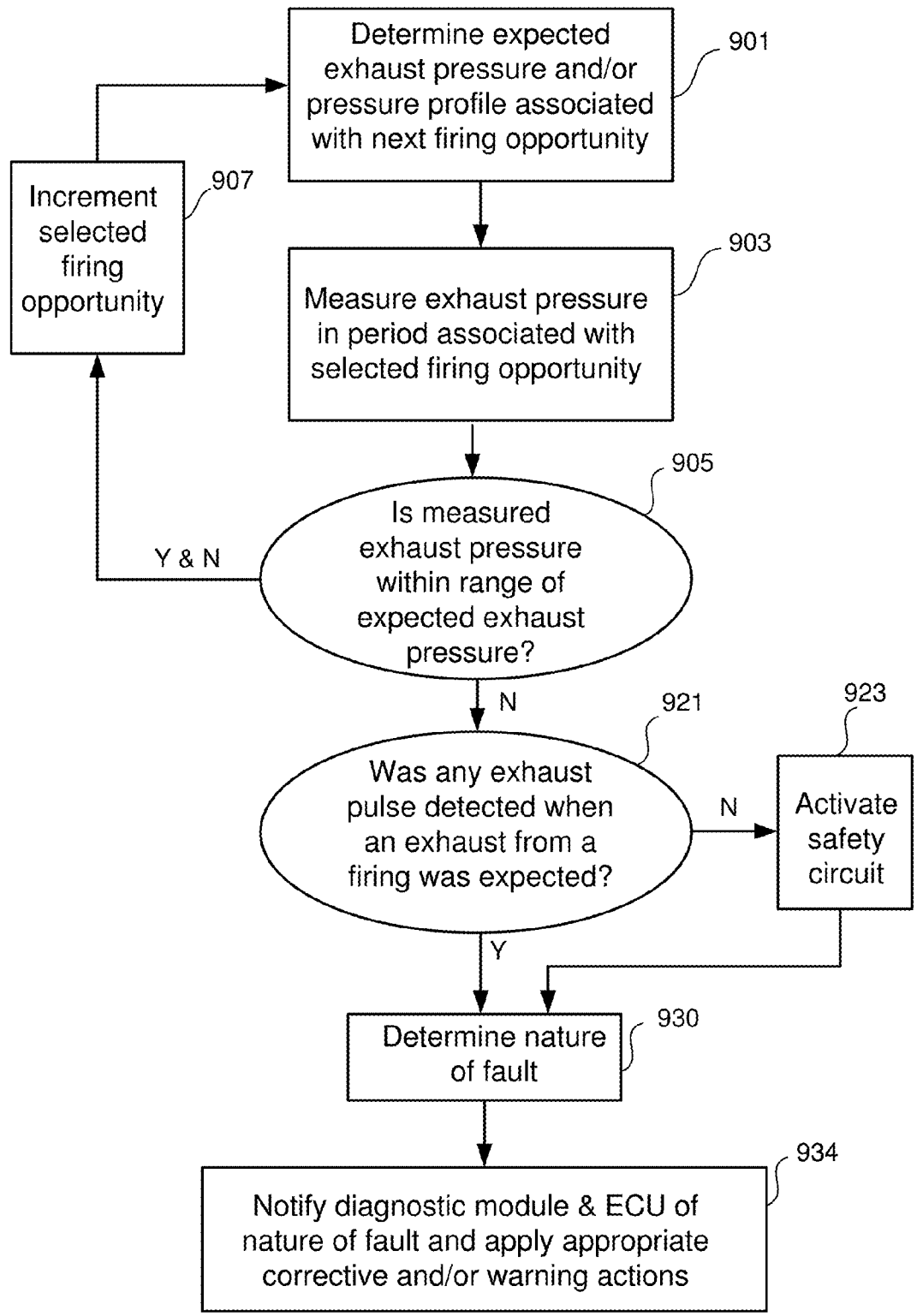
FIG. 16 is a flow chart for sensing an exhaust valve actuation fault in accordance with another embodiment.

Referring next to FIG. 16, an exemplary method of identifying valve actuation faults based at least in part on the sensing of exhaust gas pressure will be described. The described method can be performed by appropriate programming of a fault detection module, an ECU, a diagnostics controller or any other suitable mechanism. In other embodiments, the described control can be implemented using discrete or programmable logic.

Preliminarily, it should be appreciated that each cylinder working cycle has an associated exhaust event, or at least a potential exhaust event. In a normal fired working cycle, the working cycle concludes with an exhaust event during which exhaust gases are vented from the cylinder into the exhaust system sending a pulse of exhaust gases into and through the exhaust system. During working cycles in which the exhaust valve is held closed (e.g. purposely during skipped working cycles or improperly when the exhaust valve remains fully closed when it was intended to open), no such exhaust pulse occurs. Other valve actuation strategies/occurrences that involve opening and closing the exhaust valve will have corresponding pressure signatures. For example, if both the intake and exhaust valves are opened, but no fuel is delivered during a skipped firing opportunity, a pulse of uncombusted air will be pumped through the exhaust system. In another example, a reexhaust event in which the intake valve is held closed but the exhaust valve is opened during a skipped working cycle (after being vented during the previous fired working cycle) will have a different signature and so on.

Since the timing of the exhaust events associated with different cylinders is staggered, the pressure pulses (or potential/expected pressure pulses) are staggered in a similar/predicable manner. The vented exhaust gases cause a pressure wave to travel through the exhaust system at acoustic velocities and the timing and nature of the pressure wave arriving at the pressure sensor will vary in a generally predictable way based on the location of the sensor and other factors such exhaust system and exhaust gas temperature. Therefore exhaust valve timing faults can be detected by comparing the timing of the expected pulse to the time at which the corresponding pressure wave is actually detected. Valve lift faults can be detected by comparing the timing and form/signature of a detected pressure pulse to the expected timing and form/signature of the pulse.

In the illustrated method the exhaust pressure and/or pressure profile expected to be associated with the next skip fire firing opportunity exhaust event at the location of the relevant pressure sensor is determined in step 901. The pressure/pressure profile will vary as a function of a variety of factors including (i) the mass and temperature of the exhaust gases which will vary as a function of the air, fuel and residual exhaust gases introduced into the cylinder during combustion, engine temperature, etc. (ii) the location of the relevant pressure sensor (relative to the associated cylinder's exhaust port) and (iii) a variety of other factors as will be appreciated by those familiar with the art. The expected exhaust pressure may be calculated algorithmically on the fly based on current operating conditions, or retrieved from a lookup table or using other suitable methods. When lookup tables are used, a variety of different indices may be used to facilitate access to the tables. By way of example, current operating factors that have a relatively large impact on the expected exhaust pressure such as mass air charge (MAC), engine temperature, engine speed and fire/skip command are well suited for use as the lookup table indices.

In step 903, the actual exhaust pressure associated with the corresponding exhaust event is measured using a pressure sensor such as pressure sensor 906. As discussed above, multiple pressure sensors may be provided with each cylinder having its own associated pressure sensor in its associated runner, or pressure sensor(s) located further downstream may be used to measure the pressure associated with multiple exhaust events.

In step 905, a determination is made as to whether the measured exhaust pressure is within an acceptable range of the expected exhaust pressure, in terms of timing and pressure signature. If so, the exhaust valve is presumed to have operated properly and the logic indexes (907) to analyze the next firing opportunity exhaust event and the same steps 901-905 are repeated each firing opportunity.

When the measured exhaust pressure value is not within range of the expected exhaust pressure value, (the N, no, branch from decision block 905) then the nature of the default is determined and any appropriate response actions are taken as represented by steps 921-934. In parallel, the logic indexes (907) to analyze the next firing opportunity exhaust event, the Y and N (yes and no) branch from decision block 905.

If no exhaust pulse is detected when a pulse from a firing is expected (step 921), then there is a risk that a HPES exists within the associated cylinder. In such circumstances, the safety circuit is activated to prevent the intake valve from opening into the HPES (step 923).

Regardless of whether an exhaust pulse is detected, the nature of the fault may be determined as represented by step 930 and the existence and nature of the fault is reported to the diagnostics module, the ECU and/or any other appropriate modules as represented by step 934. These modules may record the nature of the fault and apply any appropriate corrective actions and/or warnings. It should be appreciated that the actual diagnosis of the error may be performed by any appropriate component, including the fault detection module, a diagnostics module, the ECU or any other suitable component and that therefore the represented steps 930 and 934 are for illustrative purposes only.

If an exhaust pulse is detected that is not within the expected range of exhaust pressure, then appropriate diagnostics can be performed to assist in determining the nature of the fault that has occurred. The nature of the pressure pulse observed during a window associated with the "exhaust" stroke can help diagnose a number of potential faults.

By way of example, if the exhaust valve was intended to be held closed during the "exhaust" stroke, but actually opened instead, there will typically be a pressure fluctuation observed by the exhaust pressure sensor, which is indicative of an exhaust valve deactivation fault. The nature of the pressure pulse detected in such circumstances will vary base on factors such as whether the intake valve opened and the nature of the gases within the corresponding cylinder when the exhaust valve was improperly opened and thus can be helpful in determining whether other faults have occurred as well. For example, if both the intake and exhaust valves open during an intended skip cycle, air will be pumped thought the cylinder and the exhausted air pulse will have a distinct pressure profile. Alternatively, if combustion occurred within the cylinder and the combusted gases were intended to be held within the cylinder to form a HPES, an unintended opening of the exhaust valve will have a much higher pressure profile. In yet another example, if the intake valve was held closed during a first working cycle (intended or otherwise) after an exhaust event from the previous working cycle, and the exhaust valve is opened again during the corresponding "exhaust" stroke, then a reexhaust event has occurred. A reexhaust event typically has yet another distinct pressure profile which can readily be identified. (The pressure profile associated with a reexhaust event is lower and has different characteristics than an exhausted air pulse).

The measured exhaust pressure may also be indicative of or suggest other types of faults such as any of a potential misfire, an intake and/or exhaust valve timing fault or a valve lift fault. For example, an exhaust valve timing fault will cause the timing of the detected pressure pulse to be delayed or advanced relative to the expected pressure pulse and the corresponding pressure profile will vary in a predictable way. Thus, the timing and profile of the pressure wave may be used to help identify valve timing faults.

A valve lift fault will often result in the valve being opened for a shorter or longer dwell time window than expected and the actual time at which the valve begins to open may be offset relative to the expected initiation of the valve lift timing. These differences may be used to help identify the existence and nature of valve lift faults.

A misfire will result in the exhaust gas pulse pressure profile being lower than expected, but as long as combustion occurs at some point, the pressure profile will typically be significantly higher than the profile associated with an air pulse, so the measured exhaust gas pressure profile can be used to help identify misfires as well.

Preferably the valve fault detection module would use any other information available to it in determining the nature of the valve fault. This could involve information received using any of the other diagnostic schemes disclosed in this application. Once the nature of the fault is identified, the appropriate corrective actions, warnings and fault recordation can be implemented. The nature of any corrective actions and/or warnings will vary based on the nature of the fault detected.

In a particular embodiment, the valve fault detection module is implemented on a processor such as the ECU, although in other embodiments it may be integrated into a diagnostics module's processor or a processor provided as part of a dedicated valve detection unit. In other embodiments, the functionality of the valve fault detection module may be implemented in discrete or programmable logic. Any of these implementations may include a fault identifier for comparing the actual exhaust pressure to the expected exhaust pressure for each of a multiplicity of selected working cycles to determine whether a valve actuation fault has occurred.

Engine Block Acceleration

Accelerometers mounted on the engine block are sometimes used to detect engine knock (and are therefore sometimes referred to as knock sensors). In general, operation of an engine in any particular set of operating conditions will tend to have associated vibration patterns which are reflected in the output of the engine block accelerometer. When knock occurs, the engine's vibration patterns change in a way that tends to be quite distinctive to knock and therefore the accelerometer output signal has a distinctive signature associated with knock. Typically the characteristic frequencies associated with engine knock are in the 2 to 4 kHz frequency range. Therefore, engine knock can be detected by looking for knock signatures in the engine block accelerometer in this frequency range. When a knock signature is detected, appropriate remedial actions can be taken to eliminate the source of the knock. The knock sensor may be configured to measure a single direction of acceleration. Generally, the sensor is aligned to optimize knock detection. Multiple sensors may be used to improve sensitivity and noise rejection.

High pressure exhaust springs have a significant impact on net engine torque, and therefore, they also tend to have distinctive impacts on engine vibration. Those engine vibration can be detected by an accelerometer mounted on the engine block—and can be thought of as HPES signatures. Unlike the signatures associated with cylinder misfire, the vibration frequencies generated by a HPES may be at a lower frequency range, approximately 10 to 500 Hz. Therefore, the presence (or absence) of high pressure exhaust springs can also be detected by looking for HPES signatures in the signal from an accelerometer mounted on the engine block. The accelerometer could be a knock sensor modified with the appropriate circuitry to detect both the "Knock" frequency range and also the "HPES" frequency range. Alternatively, the accelerometer could be an independent device tuned to a specific frequency range for the HPES detection only. When an unexpected HPES is detected, appropriate remedial actions can be taken as discussed above.

Figure 13A:
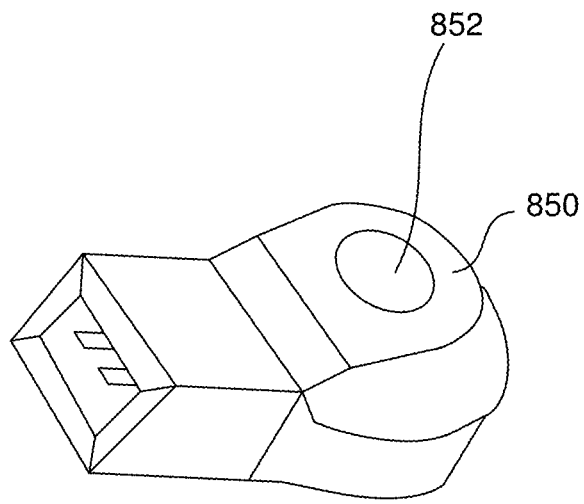
FIG. 13(a) shows a standard knock sensor.
Figure 13B:
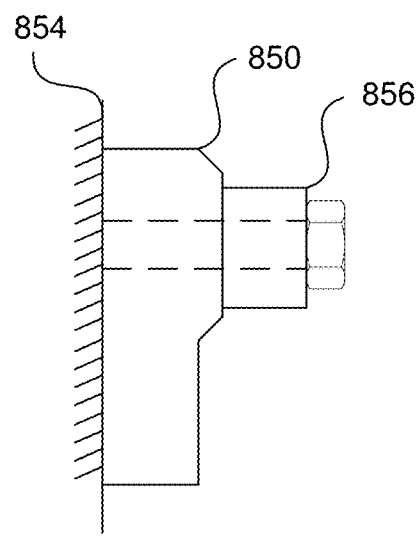
FIG. 13(b) shows a standard knock sensor and HPES detecting accelerometer mounted to an engine block according to one embodiment of the present invention.

FIG. 13(a) illustrates a conventional engine knock sensor 850. The sensor has a hole 852, which allows it to be mounted to the engine block by placing the knock sensor on a threaded stud protruding from the engine block and securing the sensor with a bolt. FIG. 13(b) illustrates the convention engine knock sensor 850 mounted to a side of an engine block 854. An accelerometer 856 to detect the presence of a HPES is also shown. The HPES accelerometer 856 may be mounted to the same threaded stud as the standard knock sensor. In this embodiment the sensors are individual units, but they may be combined into a single unit as described above.

Camshaft Speed Monitoring

The opening and closing of the intake and exhaust valves places significant torque loads on the camshaft. Most modern vehicle engines use a cam phaser to provide adjustment of the valve opening and closing times. The phaser typically utilizes a fluid coupling with some compliance. Thus the loading associated with valve opening and closing can have a direct impact on the rotational speed of the camshaft. Therefore, variations in the rotational speed of the camshaft can also be used to infer whether and when specific valve actuation events have occurred. More specifically, when an engine is operating in skip fire mode, the pressure within the cylinder after a combustion event when the exhaust valve begins to open will typically be several bar. As such, a relatively high force must be applied to the exhaust valve in order to open the valve. The force required to open the valve will cause a slight deceleration of the camshaft, which can be detected to infer whether the exhaust valve has opened. More specifically, when opening the valve, the force used to accelerate the components and collapse the valve spring will decelerate the camshaft. When the valve stops and closes, some of that kinetic energy and potential energy in the spring is returned to the camshaft, accelerating the camshaft. Monitoring these accelerations and decelerations at the appropriate times can indicate whether a valve has opened or not. Opening the intake valves also has an impact on camshaft rotational speed, which can be detected to identify or verify intake valve actuations as well.

The valve actuations can be verified by monitoring the output of a camshaft speed sensor to make sure that the expected variation in the rotational speed (or acceleration or jerk) of the camshaft are observed when expected and not observed when valve actuations are not expected. It should be appreciated that the significant forces acting on the camshaft tend to be more complex than the forces acting on the crankshaft. This is due, in part, to the fact that the camshaft is driven by the crankshaft, so variations in the rotational speed of the crankshaft also have a direct impact on the rotational speed of the camshaft. Therefore, it can be useful to create a camshaft torque model to predict the expected torque (and consequentially the rotational speed and/or acceleration) of the camshaft at any time. The actual camshaft rotational speed/acceleration/torque detected can then be compared to the expected value to determine whether certain valve actuation events have occurred.

It should be apparent that events like high pressure exhaust springs and misfires that have a significant impact on crankshaft rotational acceleration (or equivalently torsional vibration) will also impact the rotational speed/ acceleration of the camshaft. Accordingly, such events can be detected by monitoring the rotational speed of the camshaft in substantially the same way as described above with respect to the crankshaft. It is noted that while it is more complex, the use of a camshaft model has some advantages over the crankshaft model because it can more directly identify the impacts of discrete valve actuation events or non-events which can be helpful for various diagnostic and control purposes.

Solenoid Valve Current Waveform

In some embodiments the valves are controlled using an eccentric cam to open and close the valves. A collapsible valve lifter or lash adjuster incorporated in the valve train may be used to facilitate deactivation of the valves during a skipped firing cycle. The collapsible lifter is controlled using a solenoid. The solenoid allows introduction of a working fluid (such as motor oil) into the collapsible lifter to either force the lifter to remain in its fully extended (fixed state) position or allow the lifter to collapse (compressible state), leaving the valve in a closed position. An oil galley including a plurality of oil passageways may be used to deliver the pressurized oil from the solenoid to the collapsible lifter. In many cases the working fluid shifts the position of a locking pin in the collapsible lifter to shift the collapsible lifter between its fixed and compressible state. Pressurized oil applied to the pin allows compression of the collapsible lifter resulting in deactivation of the valve. Without switching of the controlling solenoid the controlled valve will not shift its state (switch from activated to deactivated or vice versa).

Correct operation of a valve, such as the opening of an exhaust valve, can thus be inferred by verifying correct operation of the controlling solenoid. Confirmation that a solenoid has switched positions may be obtained by monitoring the current waveform during a commanded switch. During the switching event the current will display an inflection point associated with the motion of the armature within the solenoid. This inflection point can be detected by analysis of the current waveform. If an inflection is not detected, it indicates that the solenoid failed to switch and the controlled valve has likewise failed to switch states.

Monitoring of the current waveform to the solenoid may thus be used to determine the presence of a HPES in a cylinder.

Safety Circuit

In some embodiments, a signal indicating the presence of a high pressure exhaust spring may result in disablement of the intake valve so it remains closed. This will prevent any mechanical damage to the intake valve or any of its associated mechanical components. This signal may be used as part of a safety circuit as described in U.S. provisional patent applications 61/879,481 and 61/890,671, each of which is incorporated herein by reference in its entirety for all purposes. This safety circuit may override any other controller requirements, such as minimizing noise, vibration, and harshness (NVH) or providing the driver requested torque. This safety feature is particularly important in skip fire operation, since the average cylinder load for the fired cylinders is greater compared to that experienced in all cylinder operation. The cylinder pressures, like those shown in curve 102 of FIG. 1, are thus generally higher and the likelihood of damaging an intake valve opening into this high pressure is increased.

Figure 14:
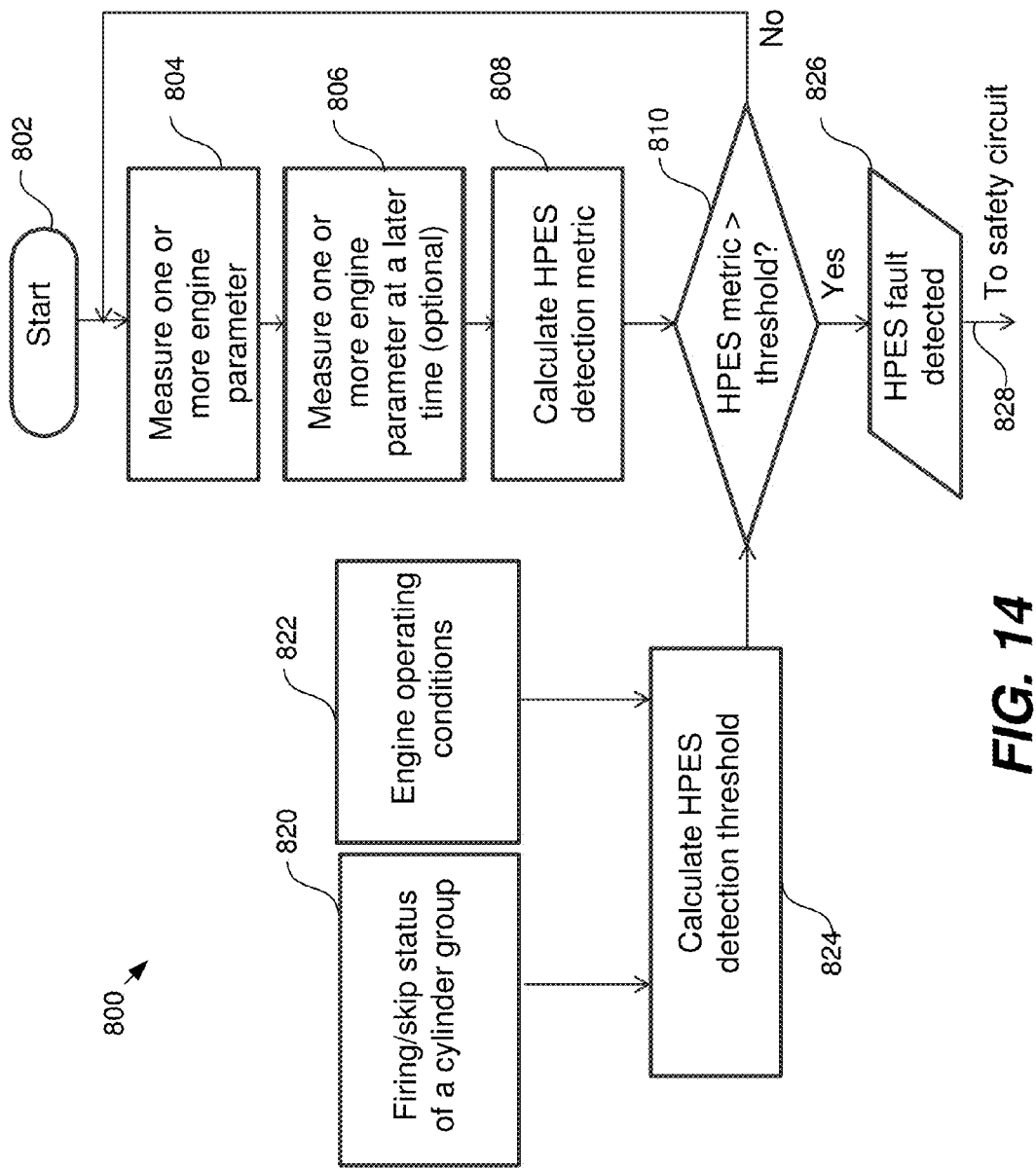
FIG. 14 is a flow chart for sensing a high pressure exhaust spring according to one embodiment of the present invention.

FIG. 14 is a flow chart illustrating a method 800 that can be used to detect a cylinder with a HPES. The method 800 is initiated at step 802. One or more engine parameters are subsequently measured at step 804. These parameters can be, but are not limited, to crankshaft speed and time derivatives thereof, cylinder gas electrical properties, intake or exhaust system flow or pressure, engine block acceleration, camshaft speed and time derivatives thereof, and solenoid current waveform. For example, a period associated with adjacent crank angle intervals may be measured to determine a first engine acceleration. In some cases an optional additional set of engine parameters may be measured at step 806. For example, a period associated with adjacent crank angle intervals at a later time may be measured to determine a second engine acceleration. The results of these one or more measured parameters can then be used to calculate a HPES detection metric. For example, a first acceleration and second acceleration may be used to determine a HPES detection metric. Note that multiple parameters may be used to determine the HPES detection metric, for example, the engine acceleration and cylinder gas electrical properties may be jointly used to determine an appropriate value. Comparing the HPES detection metric with a threshold may then be performed at step 810. The threshold is based in part on the fire/skip status of a group of engine cylinders in addition to the cylinder under test determined at step 820. This group may be all the engine cylinders or a subset of cylinders, such as the neighboring and/or opposing cylinders. The threshold is also based on the engine operating conditions, such as engine speed, intake manifold pressure, MAC, spark timing, cam advance, accessory loads, etc. determined at step 822. These conditions may be used to calculate a HPES detection threshold at step 824. If the threshold is exceeded in step 810 a HPES fault is detected at step 826. A signal 828 can then be sent to a safety circuit to inhibit operation of the intake valve of the cylinder under test. If no HPES is detected the routine returns to step 804 and the cycle repeats for the next cylinder. Method 800 should be considered exemplary only and various steps may be omitted, combined, or reordered in various embodiments.

In other embodiments, the intake valve may only be allowed to open if a LPES has been detected indicating that the intake valve will be opening into a low pressure cylinder. In still further embodiments, presence of a high pressure exhaust spring signal will cause the exhaust valve to open, venting the cylinder.

In general, the peak pressures associated with a high pressure exhaust spring will tend to dissipate through leakage and cooling over the course of several engine cycles. Therefore, some safety circuits may be arranged to allow the intake valve to open after some period of time or some number of engine cycles. This period may be preset, or based on one or more of the detected conditions described herein (e.g., the crankshaft or camshaft torque model, cylinder monitoring, etc.).

Although only a few embodiments of the invention have been described in detail, it should be appreciated that the invention may be implemented in many other forms without departing from the spirit or scope of the invention. For example, there are several references to the term, "cylinder." The term cylinder should be understood as broadly encompassing any suitable type of working chamber. Similarly, while a particular embodiment of an auxiliary electrical circuit to measure electrical properties of the spark gap had been described; many variations on this circuit may be employed. The figures illustrate a variety of devices, circuit designs and representative cylinder and/or engine data. If should be appreciated that these figures are intended to be exemplary and illustrative, and that the features and functionality of other embodiments may depart from what is shown in the figures. The present invention may also be useful in engines that do not use skip fire control. It may be incorporated into a vehicle's on board diagnostic (OBD) system to verify valve operation, detect cylinder misfires, cylinder knock, or any other combustion diagnostic. Therefore, the present embodiments should be considered illustrative and not restrictive and the invention is not to be limited to the details given herein.

What is claimed is:

1. A method of identifying valve actuation faults while operating an engine in a skip fire mode, the engine including a plurality of working chambers and an exhaust system, each working chamber having an associated exhaust valve and being arranged to operate in a succession of working cycles, each working cycle having a corresponding potential exhaust period the method comprising:

operating the engine in a skip fire mode in which working cycles are selectively skipped or fired;

for each of a multiplicity of selected working cycles estimating an expected exhaust pressure at a selected location in the exhaust system during a time period corresponding to the associated potential exhaust period;

for each of the multiplicity of selected working cycles measuring an actual exhaust pressure at the selected location in the exhaust system during the time period corresponding to the associated potential exhaust period; and for each of the multiplicity of selected working cycles comparing the actual exhaust pressure to the expected exhaust pressure to determine whether a valve actuation fault has occurred; and when it is determined that a valve actuation fault has occurred, performing at least one of (a) altering an aspect of control of the engine while the engine is operating in the skip fire mode in response to said determination; and (b) recording the detection of the valve actuation fault in a diagnostics system.

2. A method as recited in claim 1 wherein during at least some of the skipped working cycles, the exhaust valve associated with the corresponding working cycle is held closed and wherein the determination of whether a valve actuation fault has occurred includes determining whether the corresponding exhaust valve failed to open during a selected fired working cycle when it was intended to open during the selected fired working cycle.

3. A method as recited in claim 1 wherein the determination of whether a valve actuation fault has occurred includes determining whether the corresponding exhaust valve opened during a selected working cycle when it was intended to be held closed during the selected working cycle.

4. A method as recited in claim 3 wherein the determination of whether a valve actuation fault has occurred includes determining whether an unexpected air pulse was pumped through the corresponding working chamber.

5. A method as recited in claim 4 further comprising:
sensing a level of oxygen in exhaust gas pulses in the exhaust system, each exhaust gas pulse corresponding to a particular one of the working cycle of a particular one of the working chambers; and
determining whether an unexpected air pulse was pumped through a particular one of the working chambers during a particular one of the working cycles based at least in part on the sensed oxygen level in the exhaust gas pulse corresponding to the particular one of the working cycles and the measured exhaust pressure associated with such exhaust gas pulse.

6. A method as recited in claim 3 wherein the determination of whether a valve actuation fault has occurred includes determining whether combusted exhaust gases were expelled from the corresponding working chamber when they were intended to be held within the working chamber to form a high pressure gas spring.

7. A method as recited in claim 3 wherein the determination of whether a valve actuation fault has occurred includes determining whether an unexpected reexhaust event has occurred in corresponding working chamber.

8. A method as recited in claim 1 wherein the determination of whether a valve actuation fault has occurred includes determining whether an exhaust valve timing fault has occurred.

9. A method as recited in claim 1 wherein the determination of whether a valve actuation fault has occurred includes determining whether an exhaust valve lift fault has occurred.

10. A method as recited in claim 1 wherein the determination of whether a valve actuation fault has occurred includes determining whether an intake valve actuation fault has occurred.

11. A method as recited in claim 1 wherein:
each exhaust valve has an associated exhaust port and the exhaust system includes an exhaust manifold having a plurality of runners, each runner being arranged to receive exhaust gasses from an associated one of the exhaust ports; and
a plurality of exhaust gas pressure sensors, each exhaust gas pressure sensor being arranged to detect exhaust gas pressure in an associated one of the runners.

12. A method as recited in claim 11 wherein each runner is associated with a single one the working chambers.

13. A method as recited in claim 1 further comprising:
sensing a level of oxygen in exhaust gas pulses in the exhaust system, each exhaust gas pulse corresponding to a particular one of the working cycle of a particular one of the working chambers; and
determining whether an unexpected air pulse was pumped through a particular one of the working chambers during a particular one of the working cycles based at least in part on the sensed oxygen level in the exhaust gas pulse corresponding to the particular one of the working cycles.

14. A valve actuation fault detection system for detecting valve actuation faults while operating an engine in a skip fire mode, the engine including a plurality of working chambers and an exhaust system, each working chamber having an associated exhaust valve and being arranged to operate in a succession of working cycles, each working cycle having a corresponding potential exhaust period the valve actuation fault detection system comprising:
at least one exhaust gas pressure sensor for measuring exhaust gas pressure;
an expected exhaust gas pressure determining module for determining an expected exhaust pressure at a selected location in the exhaust system during potential exhaust period associated with a particular working cycle; and
a fault identifier for comparing the actual exhaust pressure to the expected exhaust pressure for each of a multiplicity of selected working cycles to determine whether a valve actuation fault has occurred, wherein the fault identifier is configured to, in response to the determination of a valve actuation fault, perform at least one of (a) notify an engine control component to facilitate altering an aspect of control of the engine while the engine is operating in the skip fire mode in response to said determination, and (b) record the detection of the valve actuation fault in a diagnostics system.

15. A method of identifying valve actuation faults while operating an engine in a skip fire mode, the engine including a plurality of working chambers and an exhaust system, each working chamber having an associated exhaust valve and being arranged to operate in a succession of working cycles, each working cycle having a corresponding potential exhaust period the method comprising:
operating the engine in a skip fire mode in which working cycles are selectively skipped or fired;
sensing a level of oxygen in exhaust gas pulses in the exhaust system, each exhaust gas pulse corresponding to a particular one of the working cycles of a particular one of the working chambers; and
determining whether an unexpected air pulse was pumped through a particular one of the working chambers during a particular one of the working cycles based at least in part on the sensed oxygen level in the exhaust gas pulse corresponding to the particular one of the working cycles; and
when it is determined that an unexpected air pulse has occurred, performing at least one of (a) altering an aspect of control of the engine while the engine is operating in the skip fire mode in response to said determination; and (b) recording the detection of the unexpected air pulse in a diagnostics system.

* * * * *